United States Patent
Lan et al.

(10) Patent No.: US 12,265,528 B1
(45) Date of Patent: Apr. 1, 2025

(54) NATURAL LANGUAGE QUERY PROCESSING

(71) Applicant: Amazon Technologies, Inc., Seattle, WA (US)

(72) Inventors: Wuwei Lan, La Jolla, CA (US); Patrick Ng, Great Neck, NY (US); Zhiguo Wang, Syosset, NY (US); Ramesh M. Nallapati, San Jose, CA (US); Henghui Zhu, Jersey City, NJ (US); Anuj Chauhan, New York, NY (US); Sudipta Sengupta, Bellevue, WA (US); Stephen Michael Ash, Seattle, WA (US); Bing Xiang, Mount Kisco, NY (US); Gregory David Adams, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 8 days.

(21) Appl. No.: 18/187,553

(22) Filed: Mar. 21, 2023

(51) Int. Cl.
  *G06F 16/00* (2019.01)
  *G06F 16/22* (2019.01)
  *G06F 16/242* (2019.01)
  *G06F 16/2457* (2019.01)
  *G06F 16/248* (2019.01)
  *G06F 16/25* (2019.01)
  *G06N 3/0455* (2023.01)
  *G06N 3/0499* (2023.01)

(52) U.S. Cl.
  CPC ......... *G06F 16/243* (2019.01); *G06F 16/221* (2019.01); *G06F 16/24578* (2019.01); *G06F 16/248* (2019.01); *G06F 16/258* (2019.01); *G06N 3/0455* (2023.01); *G06N 3/0499* (2023.01)

(58) Field of Classification Search
  None
  See application file for complete search history.

(56) References Cited

U.S. PATENT DOCUMENTS

| | | | |
|---|---|---|---|
| 7,475,010 | B2 | 1/2009 | Chao |
| 7,526,425 | B2 | 4/2009 | Marchisio et al. |
| 8,301,438 | B2 | 10/2012 | Ferrucci et al. |
| 8,856,096 | B2 | 10/2014 | Marchisio et al. |
| 8,983,994 | B2 | 3/2015 | Neels et al. |
| 9,135,238 | B2 | 9/2015 | Bunescu et al. |

(Continued)

FOREIGN PATENT DOCUMENTS

| | | |
|---|---|---|
| CN | 116842185 A | 10/2023 |
| WO | 2020/263711 A1 | 12/2020 |

OTHER PUBLICATIONS

U.S. Appl. No. 17/219,656, filed Mar. 31, 2021, Wang et al.

(Continued)

*Primary Examiner* — Thu Nguyet T Le
(74) *Attorney, Agent, or Firm* — Nicholson De Vos Webster & Elliott LLP

(57) ABSTRACT

Techniques for handling natural language query processing are described. In some examples, a sequence-to-sequence model is used to handle a natural language query. Post-processing of a result of the sequence-to-sequence model utilizes fine-grained information from an entity linker. In some examples, the sequence-to-sequence model and aspects of a natural language query pipeline are used to handle a natural language query.

18 Claims, 15 Drawing Sheets

(56) References Cited

U.S. PATENT DOCUMENTS

| | | |
|---|---|---|
| 9,703,861 B2 | 7/2017 | Brown et al. |
| 9,798,748 B2 | 10/2017 | Brocato |
| 10,303,999 B2 | 5/2019 | Hertz et al. |
| 10,304,444 B2 | 5/2019 | Mathias et al. |
| 10,318,586 B1 | 6/2019 | Rose |
| 10,657,125 B1 | 5/2020 | Gautam et al. |
| 10,747,761 B2 | 8/2020 | Zhong et al. |
| 10,956,469 B2 | 3/2021 | Butler |
| 11,086,861 B2 | 8/2021 | Staar |
| 11,360,969 B2 | 6/2022 | Lal |
| 2003/0217052 A1 | 11/2003 | Rubenczyk et al. |
| 2005/0262051 A1 | 11/2005 | Dettinger |
| 2008/0016049 A1 | 1/2008 | Dettinger |
| 2011/0131216 A1 | 6/2011 | Chakravarthy et al. |
| 2012/0254143 A1 | 10/2012 | Varma et al. |
| 2015/0073798 A1 | 3/2015 | Karov et al. |
| 2016/0041986 A1 | 2/2016 | Nguyen |
| 2017/0060868 A1* | 3/2017 | Rais Ghasem ....... G06F 16/243 |
| 2017/0212895 A1 | 7/2017 | Ahmed |
| 2018/0060422 A1 | 3/2018 | Wegryn |
| 2018/0082183 A1* | 3/2018 | Hertz ..................... G06Q 10/10 |
| 2018/0218042 A1 | 8/2018 | Krishnan |
| 2018/0329993 A1* | 11/2018 | Bedadala .......... G06F 16/90332 |
| 2019/0095444 A1 | 3/2019 | Payne |
| 2019/0197185 A1 | 6/2019 | Miseldine |
| 2020/0034362 A1 | 1/2020 | Galitsky |
| 2020/0073983 A1 | 3/2020 | Sen |
| 2020/0117737 A1 | 4/2020 | Gopalakrishnan |
| 2020/0302122 A1 | 9/2020 | Lai |
| 2020/0372219 A1 | 11/2020 | Relangi et al. |
| 2021/0019309 A1 | 1/2021 | Yadav et al. |
| 2021/0042307 A1 | 2/2021 | Mustafi |
| 2021/0390099 A1 | 12/2021 | Rahmfeld |
| 2022/0121656 A1 | 4/2022 | Zheng |
| 2022/0138216 A1 | 5/2022 | Kesarwani |

OTHER PUBLICATIONS

U.S. Appl. No. 17/219,689, filed Mar. 31, 2021, Wang et al.
U.S. Appl. No. 17/219,706, filed Mar. 31, 2021, Wang et al.
Non-Final Office Action, U.S. Appl. No. 18/187,569, filed Jan. 31, 2024, 25 pages.

* cited by examiner

NATURAL LANGUAGE QUERY PROCESSING

BACKGROUND

As the technological capacity for organizations to create, track, and retain information continues to grow, a variety of different technologies for managing and storing the rising tide of information have been developed. Database systems, for example, provide clients with many different specialized or customized configurations of hardware and software to manage stored information. However, the increasing amounts of data that organizations must store and manage often correspondingly increases both the number, size and complexity of data storage and management technologies that are used to perform various operations and services, such as utilizing the features of database systems, object stores, and data streams, which in turn escalate the cost of maintaining the information. Moreover, as different data storage technologies offer different performance benefits and features, tailoring the location of data to a data storage technology that provides performance and analysis benefits for that data may result in different datasets being spread across many different locations and types of storage systems.

BRIEF DESCRIPTION OF DRAWINGS

Various examples in accordance with the present disclosure will be described with reference to the drawings, in which.

DETAILED DESCRIPTION

The present disclosure relates to methods, apparatus, systems, and non-transitory computer-readable storage media for handling natural language queries.

Various techniques of interactive assistance for executing natural language queries to datasets are described herein. In large enterprises, hundreds or thousands of datasets may be stored across different data storage systems. These datasets may be made up of large fact/dimension tables and many reporting views that aggregate and transform their data across various dimensions. For users attempting to utilize this information (e.g., for business intelligence or other analytics), it can be challenging or impossible to know what datasets are available (and the contents of datasets) and how to interact with the various storage systems or other technologies storing datasets. For example, one may need to know how to make a structured query language (SQL) call, where to make such a call, how to interpret the results, etc.

Detailed herein are examples of natural language query processing that provide users with an interface to submit natural language queries for requested data without having to understand or directly utilize underlying data storage system interfaces. Moreover, in some embodiments, natural language queries may allow for data discovery so that a natural language query need not explicitly specify the datasets to which query is directed.

Figure 1:
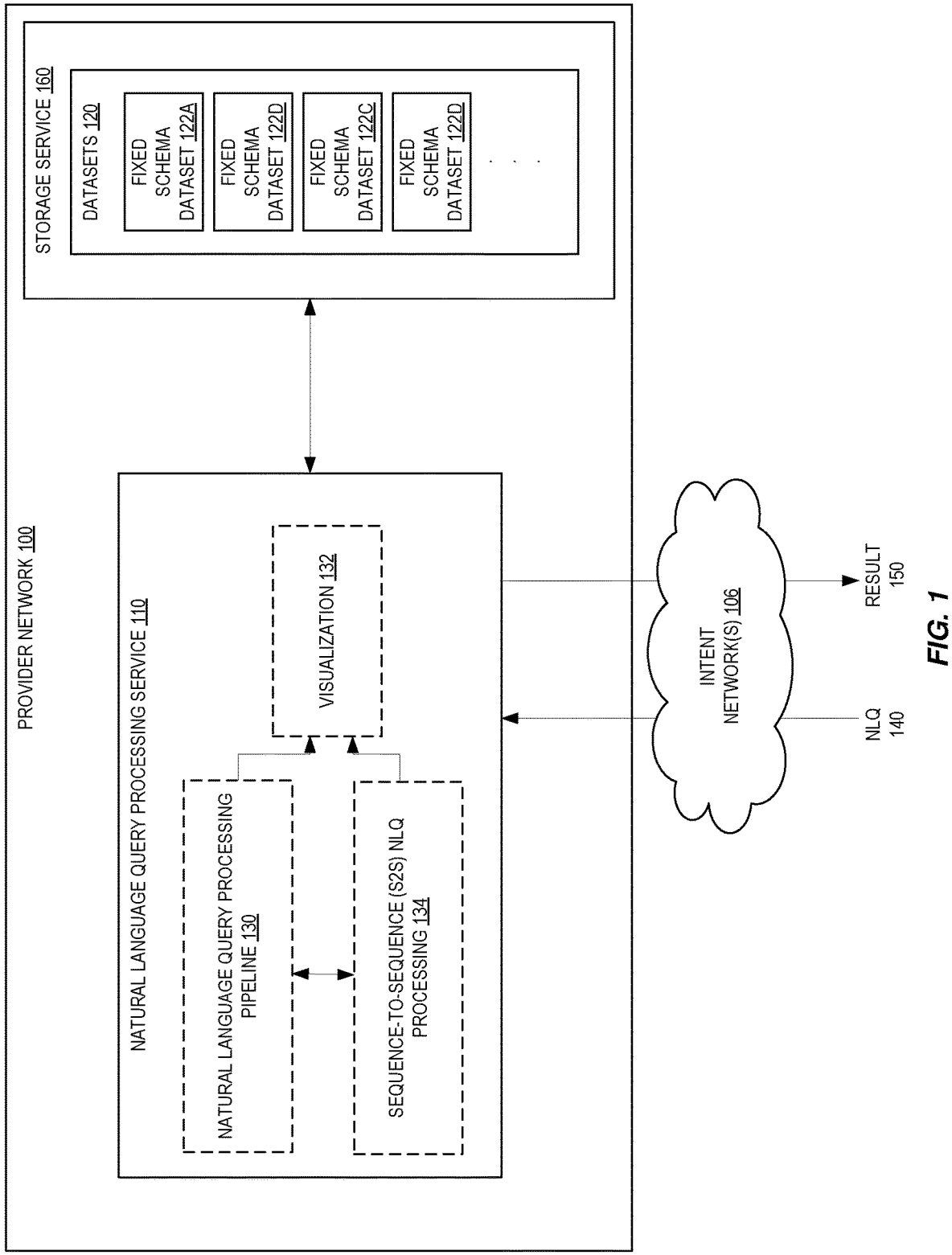
FIG. 1 illustrates examples of a natural language query processing system to handle natural language queries.

FIG. 1 illustrates examples of a natural language query processing system to handle natural language queries. In particular, the natural language query processing system 110 takes in questions in the form of natural language queries and provides a result to those questions. The natural language query processing system 110 may implement an interface that supports receiving natural language queries, such as natural language query 140. A natural language query 140 may not conform to any specify query language or other structured language, protocol, or parameters for interfacing with specific data storage systems for schema datasets 122 and/or natural language query processing system 110, but instead may exhibit natural human language features including various verbs, nouns, clauses, phrases, or other human syntax for expressing a query for a result generated or returned from fixed schema datasets 122, in various embodiments. As a result, natural language queries may include multiple formulations of input words that may query for the same result.

The natural language query processing system 110 may implement a natural language query processing pipeline 130 and/or S2S processing 134, both of which will be discussed in greater detail below, to generate intent representations which are then used to generate the appropriate queries, requests, or other interactions with storage systems (similar to an SQL query) that store schema datasets 122 to generate a desired result for natural language query, which may be provided as indicated at result 150. Such a result 150 may be returned as a text-based result and/or may be used to generate various result displays (e.g., various charts, graphs, or other visualizations of data that answers the natural language query) as result 150.

An intent representation may include the dataset to access along with various information to generate a result such as various metrics to be determined for the natural language query from the dataset (e.g., including functions such as aggregation, like SUM, operands for the function), a group by list, filters to apply, among other features to perform the natural language query.

In some examples, a natural language query processing system 110 provides access to various schema datasets 120, which may include datasets 122a, 122b, 122c, 122d, and so on, stored across one or multiple different data storage systems or technologies. Schema datasets 120 may be structured datasets, in some embodiments, where rows, columns, fields (or cell values), or other structure may be utilized to logically organize data stored according to a fixed schema (e.g., a data model or other pre-defined set of rules, constraints, or other information that defines the relationships between data in a dataset, such as the number of columns, names of columns, types of data in columns, etc.) in datasets 120. Datasets may be tables, for example, which are stored according to a fixed schema that describes the number of columns, names of columns, and types of data in the columns of the table.

Natural language query processing system 110 may be implemented as part of a data storage system (e.g., as part of a database system, object-based storage system, file system, or other storage system), or implemented as part of a business intelligence service or other analytics platform.

A visualization and formatting component 132 provides results to a user and formats intent representations for usage with different execution systems. This allows for the support for natural language query processing across multiple dataset storage systems. For example, natural language query processing 130 and/or S2S 134 may be implemented as a front-end system or interface for database systems, file systems, or various other back-end storage systems which could support the operations specified in a natural language query to return a result.

In some examples, the datasets 120 are stored by a storage service 160 of a provider network and the natural language query processing system 110 is a service of a provider network. A provider network 100 (or, "cloud" provider network) provides users with the ability to use one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources can be provided as services, such as a hardware virtualization service that can execute compute instances, a storage service that can store data objects, etc. The users (or "customers") of provider networks 100 can use one or more user accounts that are associated with a customer account, though these terms can be used somewhat interchangeably depending upon the context of use. Users can interact with a provider network 100 across one or more intermediate networks 106 (e.g., the internet) via one or more interface(s), such as through use of application programming interface (API) calls, via a console implemented as a website or application, etc. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. The interface(s) can be part of, or serve as a front-end to, a control plane of the provider network 100 that includes "backend" services supporting and enabling the services that can be more directly offered to customers.

For example, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A cloud provider network can be formed as a number of regions, where a region is a geographical area in which the cloud provider clusters data centers. Each region includes multiple (e.g., two or more) availability zones (AZs) connected to one another via a private high-speed network, for example a fiber communication connection. An AZ (also known as a "zone") provides an isolated failure domain including one or more data center facilities with separate power, separate networking, and separate cooling from those in another AZ. A data center refers to a physical building or enclosure that houses and provides power and cooling to servers of the cloud provider network. Preferably, AZs within a region are positioned far enough away from one another so that a natural disaster (or other failure-inducing event) should not affect or take more than one AZ offline at the same time.

Users can connect to an AZ of the cloud provider network via a publicly accessible network (e.g., the Internet, a cellular communication network), e.g., by way of a transit center (TC). TCs are the primary backbone locations linking users to the cloud provider network and can be collocated at other network provider facilities (e.g., Internet service providers (ISPs), telecommunications providers) and securely connected (e.g., via a VPN or direct connection) to the AZs. Each region can operate two or more TCs for redundancy. Regions are connected to a global network which includes private networking infrastructure (e.g., fiber connections controlled by the cloud provider) connecting each region to at least one other region. The cloud provider network can deliver content from points of presence (or "POPs") outside of, but networked with, these regions by way of edge locations and regional edge cache servers. This compartmentalization and geographic distribution of computing hardware enables the cloud provider network to provide low-latency resource access to users on a global scale with a high degree of fault tolerance and stability.

To provide these and other computing resource services, provider networks 100 often rely upon virtualization techniques. For example, virtualization technologies can provide users the ability to control or use compute resources (e.g., a "compute instance," such as a VM using a guest operating system (O/S) that operates using a hypervisor that might or might not further operate on top of an underlying host O/S, a container that might or might not operate in a VM, a compute instance that can execute on "bare metal" hardware without an underlying hypervisor), where one or multiple compute resources can be implemented using a single electronic device. Thus, a user can directly use a compute resource (e.g., provided by a hardware virtualization service) hosted by the provider network to perform a variety of computing tasks. Additionally, or alternatively, a user can indirectly use a compute resource by submitting code to be executed by the provider network (e.g., via an on-demand code execution service), which in turn uses one or more compute resources to execute the code-typically without the user having any control of or knowledge of the underlying compute instance(s) involved.

A goal of the NLQ processing service 110 is to answer a user's questions with respect to their structured data, and return the results in the form of proper visual type. In some examples, the NLQ processing service 110 has two phases: a topic modeling phase and a question answering (inference) phase. In the first phase, users create a topic, upload their structured datasets (e.g., schema datasets 122a-d), and provide metadata accordingly, such as column descriptions, column alias, cell value alias, domain specific expressions and frequently used filters. An index is created for these topic metadata for easy retrieval.

Figure 2:
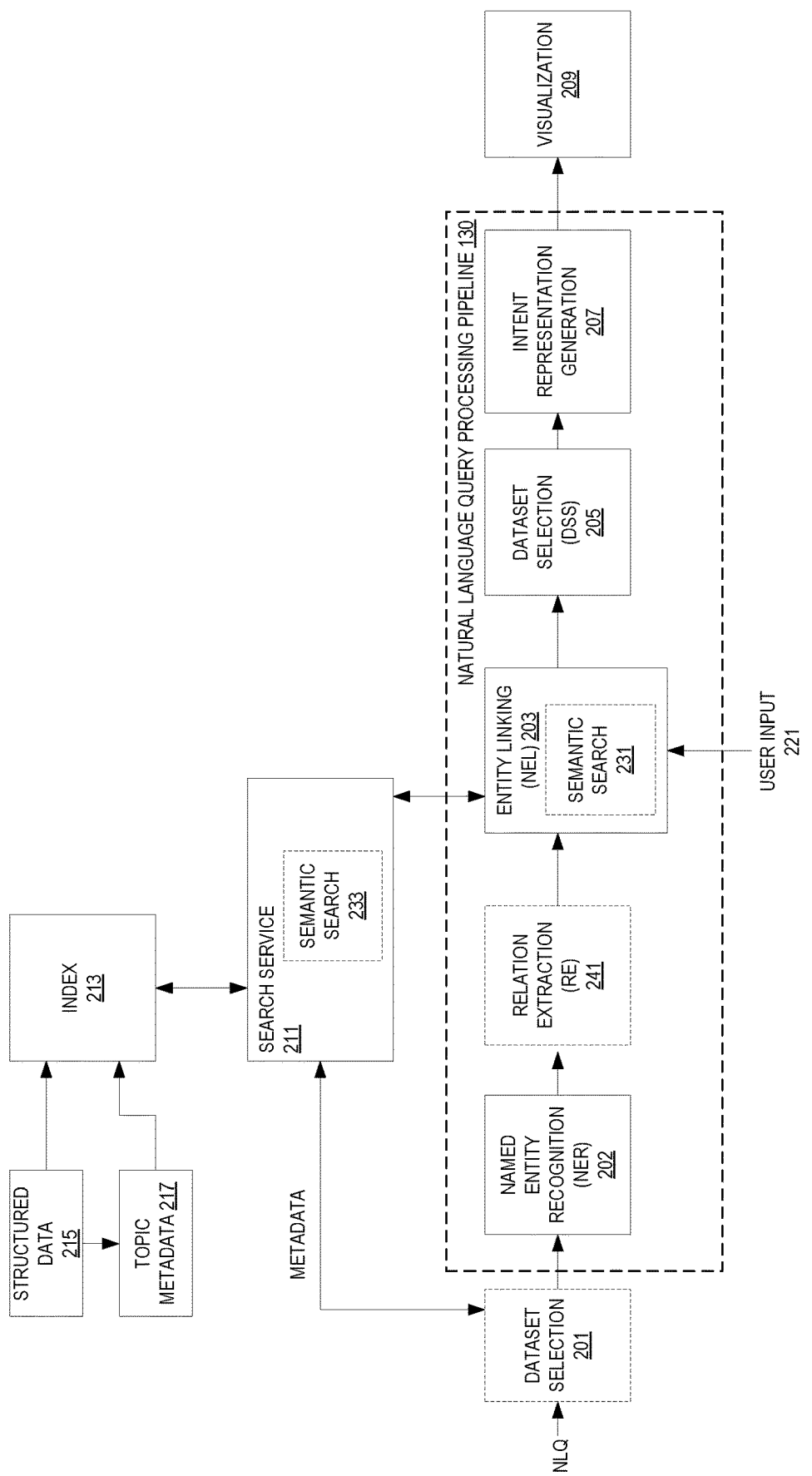
FIG. 2 illustrates examples of a natural language query ML-based processing pipeline.

In the second phase, users ask their questions in natural language and get their answers back in the form visual displays. In some examples, a machine learning (ML)-based pipeline with human-in-the-loop is used in this space. The human-in-the-loop usage occurs when there are ambiguities in user's databases. FIG. 2 illustrates examples of a natural language query ML-based processing pipeline such as natural langue query processing pipeline 130.

In some examples, an initial dataset selection 201 provides a first pass or initial selection of possible datasets to use for providing a result to natural language query. For example, dataset selection 201 may determine from the datasets available to be accessed (e.g., datasets 122a-d of FIG. 1) for natural language query (e.g., those datasets associated with a common user account), a proper subset of available datasets to be a candidate set of datasets.

Dataset selection 201 may utilize a dataset index search service 211, in some embodiments, to determine candidate datasets. For example, the search service 211 access an index 213 of topic metadata 217 for available datasets 215 (e.g., both enhanced metadata, such as metadata that may be manually or automatically collected from schemas or other datasets directly specified). The metadata 217 may include global (e.g., account wide synonyms) or domain (sometimes referred to as a topic) synonyms, column names, column aliases, or other information describing the datasets. The search service 211 uses the text of a natural language query to search the index 213 and identify possible column matches of the available datasets for the natural language query. In some examples, the search string is passed after removing stop indications or other features not relevant for dataset selection. The search may be performed using a search API or other interface and may allow for non-exact or "fuzzy" matches. In some examples, one or more of the structure data 215, topic metadata 217, and index are stored using a storage service of a provider network.

Dataset selection 201 may then take the possible column matches from available dataset index search 211 and rank those available datasets with possible column matches according to a respective similarity score determined for those available datasets with possible column matches, in some embodiments. For example, a similarity score, such as Okapi Best Matching (BM) 25 or other measure of textual similarity may be determined for individual columns and then aggregated for each dataset as a whole (e.g., as a single dataset may be used to answer the natural language query in some embodiments). Dataset selection 201 may also take a subset of those available datasets with possible column matches according to their similarity scores. For example, a top X number of datasets may be selected. These selected datasets may be the candidate datasets provided to a named entity recognition component 202.

The search service 211 may take the candidate datasets from the dataset selection 201 and obtain those datasets' metadata (e.g., from automated and manually specified sources) to generate a metadata snapshot in some examples. Note that the search service 211 does not need dataset selection 201 to generate a metadata snapshot. A metadata snapshot may be used by various stages of natural language query processing to inform analysis. As a metadata snapshot can represent a significantly reduced set of metadata than if all the metadata of all available datasets were provided to natural language query processing (e.g., reduced from the metadata for thousands or hundreds of thousands of datasets to 20 datasets), a metadata snapshot can improve the performance of natural language query processing by providing relevant information to conduct a rich analysis of metadata at various processing stages in an efficient manner as the amount of metadata provided is significantly reduced.

Below is an example of a metadata snapshot which may be provided:

{
"datasets":[
{
"domainId":
"mDuNOhUPGWEgK978uB3Ug1VoMYAf7ekS",
"datasetId": "b767e871-5aa6-4072-80b4-a179aa517f56",
"datasetName": "vw_weekly_rv_X",
"importMode": "DATASET_IMPORT", #DATASET_IMPORT| DIRECT #(optional) User-provided friendly name
"datasetDescription": "Weekly revenue for X products",
aliases are synonyms
"datasetAliases": [
"weekly revenue"
],
"datasetUsageCount": 10, #how many visuals does this appear in
"dataAggregation": {
columnId of the primary date column that rows are preaggregated
on
"dimColumnId": "955bb270-c84d-4e4b-a37f-49ffb757c30c",
for time based datasets, this describes the granularity of
rows; e.g. this is the "dataset level granularity"
"dimGranularity": "WEEK"
},
"columns": [
{
a typical dimension field
"columnId": "955bb270-c84d-4e4b-a37f-49ffb757c30c",
"columnName": "wk_start_dt", #physicalType corresponds to overlay types (e.g., supported by a
query execution system, ATTRIBUTE (string)| INTEGER| MONEY|
NUMBER| TIME| TEXT
"physicalType": "TIME",
(optional) semantic type information
"semanticType": {
types may be uniquely defined by the typeName+subTypeName
"typeName": "Date",
(optional) some types have subtypes too;
typeName+subTypeName together
uniquely define the semantic type

```
"sub TypeName": "Date",
#some types have parameters; they are type specific
"typeParameters": {
#string key/value pairs; none defined yet
}
},
#(optional) user-provided friendly name
"columnFriendlyName": "week start",
#longer user-provided description
"columnDescription": " ",
#aliases may be synonyms
"columnAliases": [
"week"
],
"columnUsage": "DIMENSION", #DIMENSION| MEASURE
"columnUsageCount": 17, #analogous to datasetUsageCount
#if time-based dataset then this indicates that this column
#contains the time axis and is reported at the given granularity
"timeGranularity": "WEEK"
},
{
#a typical measure field
"columnId": "42469ffc-6824-4230-b25f-0e3ad63cle56",
"columnName": "X_rev_bk",
#(optional) User-provided friendly name
"columnFriendlyName": "week start",
"physicalType": "NUMBER",
"columnDescription": "revenue",
"columnAliases": [
"booked",
"rev"
],
"columnUsage": "MEASURE",
#the default agg for this column if set by the user (else null)
#COUNT| DISTINCT_COUNT| MIN| MAX| MEDIAN| SUM| AVERAGE|
#STDEV| STDEVP| VAR| VARP (note: no PERCENTILE here)
#this agg must be in the allowedAggregations (if defined)
"aggregation": "SUM"
#if present, these are user-specified allowed aggregations
#if empty then no aggregations are allowed on this field
#if undefined or null then the user has not indicated what is
#allowed
#the aggs in allowedAggregations cannot also be present in
#notAllowedAggreg
#valid values:
#COUNT| DISTINCT_COUNT| MIN| MAX| MEDIAN| SUM| AVERAGE| #STDEV| STDEVP| VAR| VARP| PERCENTILE
"allowedAggregations": [
#if present, these are user specified aggs that are NOT allowed
#if empty, null, or undefined then the user has not indicated
#that any are not allowed
"notAllowedAggregations": [
]
}
],
"namedExpressions": [
{"expressionId":"42469ffc-6824-4230-b25f-0e3ad63cle56",
"expressionName": "Booked+Pipeline",
"physicalType": "NUMBER", #overlay type
"expression": "lag (sum ({b767e871-5aa6-4072-80b4-a179aa517f56.X_rev_bk},
"expressionAliases": [
"pipeline"
],
#other expression aliases
],
"namedFilters": [
{
#named filter is a predicate with a name and aliases that
#Users define
"filterId": "1bffb438-2667-4a8d-9125-925433f63141",
"filterName": "Paid Users",
"otherAliases": [
"Paying Subscribers"
"filterType": "CATEGORY_FILTER",
"function": "contains",
"inverse": false,
"operandField": {
"id": "955bb270-c84d-4e4b-a37f-49ffb757c30c" #col id
},
"constant": {
{"constantType":  "COLLECTIVE",  #SINGULAR, RANGE, COLLECTIVE
"value": [
}
"constantType": "SINGULAR",
"value": "PaidAnnual"
},
{
"constantType": "SINGULAR",
"value": "PaidMonthly"
}
]
},
#other datasets]
]
}
```

As indicated in the example above, various enumerations may be used in a metadata snapshot to describe a dataset. For example, Import Mode, Data Aggregation→Dimension Granularity (e.g., YEAR, QUARTER, MONTH, WEEK, DAY, HOUR, MINUTE), Columns→Physical Type (e.g., ATTRIBUTE (string), INTEGER, MONEY, NULL, NUMBER, TIME, TEXT), Columns→Column Usage (e.g., DIMENSION|MEASURE), Columns→Aggregation (e.g., COUNT, DISTINCT_COUNT, MIN, MAX, MEDIAN, SUM, AVERAGE, STDEV, STDEVP, VAR, VARP), Columns→Allowed Aggregations (e.g., may be manually configured to specify allowed aggregations), Columns→Not Allowed Aggregations (e.g., may be manually configure to specify not allowed aggregations), Columns→Time Granularity (e.g., YEAR, QUARTER, MONTH, WEEK, DAY, HOUR, MINUTE), Named Filter→Filter Type (e.g., CATEGORY_FILTER, NUMERIC_EQUALITY_FILTER, NUMERIC_RANGE_FILTER. DATE_RANGE_FILTER, RELATIVE_DATE_FILTER, EQUALS), Default Filter→Filter Class (e.g., CONDITIONAL VALUE FILTER, ENFORCED VALUE FILTER), and Constant→Constant Type (e.g., SINGULAR, RANGE, COLLECTIVE). Other metadata enumerations in the snapshot may include default per-column filters, column hierarchies or related fields, and schema alignment between datasets.

The named entity recognition (NER) component 202 identifies entities in the natural language query and attaches a type for each entity. In some examples, the named entity recognition (NER) component 202 includes an entity recognition model which is a machine learning model trained to identify all entities within a natural language query. An entity recognition model may utilize as inputs the results of a cell value search (e.g., from search service 211 of the index 213), a lightweight dataset selection out of dataset selector 201, a metadata snapshot (e.g., generated by the search service 211 based on indexed topic metadata 217), a natural language query, as well as other information that may be provided, such as user selected features (e.g., columns, cell values, etc.) prompted by auto-complete or query assistance features. The named entity recognition (NER) component 202 identifies the entities (e.g., by identifying the specified text or characters of the entity, the offset and length of the entity within the query text string, a confidence score for the entity), and entity type.

Entity types may, in various embodiments, describe the semantic role that the entity is expected to perform in the natural language query. For example, in the question "List the number of attending operating and other doctors in each state who are treating cancer patients", the NER 202 may identify the following entities and entity types as an output:

Entities| Types
number of | AGG_FUNCTION_VALUE
attending| DISTINCT_COUNT_METRIC_COLUMN
operating| DISTINCT_COUNT_METRIC_COLUMN
other| DISTINCT_COUNT_METRIC_COLUMN
doctors| DISTINCT_COUNT_METRIC_COLUMN
state| GROUPBY_COLUMN
cancer| CONST_VALUE_CONTAINS_FALSE_CELL In some examples, the NER component 202 is an entity recognition model that takes in an input at least a natural language query as well as any user-specified entity linkages (e.g., mappings between an entity and column or cell value) to recognize entities and provide entity types. For example, ways to chunk entity spans (e.g., ranges of characters in the natural language query text string) may depend on the underlying dataset schemas and actual data. For example, in the question "Show me monthly sales per product for the last 3 months", "monthly" and "sales" may be treated as two entities if there are "sales" and "order_date" columns in the underlying schema. On the other hand, if the schema contains a pre-aggregated column "monthly_sales", "monthly sales" may need to be detected together as a single entity. To account for these and other scenarios, NER component 202 is schema aware, in some examples, to take the schema information into account when detecting entities in natural language queries utilizing metadata or a metadata snapshot (that is a proper subset of available datasets and candidate datasets), the NER component 202 can avoid having to evaluate a large number of datasets. In this way, high latency and high computation cost may be avoided.

In some examples, the NER component 202 dataset selection 201 implements a cell value search to index over metadata describing cell values of datasets. A cell value search searches the index to determine cell values for possible cell values references in natural language query.

The NER component 202 may be, as noted above, schema aware because of a metadata snapshot. The NER component 202, in some examples, is implemented as a deep learning model, utilizing a neural network trained to identify entities in a given query text string and other input data. In some embodiments, for example, the NER component 202 implements an input layer for the model that uses fuzzy matched column names and cell values to the natural language query, and feeds the sequence into a transformer-based encoder (e.g., Bidirectional Encoder Representations from Transformers (BERT) encoder or T5 encoder). In this way, the cross-attention between the natural language query and schemas will help the model to better understand the user intent. In the output layer, a span (e.g., range of characters in the natural language query string) based entity classification layer may be implemented to assign entity recognition labels for all possible spans (up to a maximum length). For the spans that are not entities "N/A" labels may be assigned. To further improve the recall, a gazetteer list with the fuzzy matched column names and cell values may be created and used to force the NER component 202 to predict entities for the matched spans, and prune overlapping spans with the matched spans.

Linkable entities (e.g., entities capable of being linked to a column or cell value) identified in a natural language query determined by the NER 202 are provided to the search service 211 in some examples. The search service 211 retrieves a list of linking candidates for each entity using a lexical search that looks for literal matches between query terms and metadata attributes.

For example, for entities of type "column name", candidates may be retrieved from a column name index. The column name index, which may be generated from metadata provided (as discussed) above for the various available datasets, may be used to identify column names using known column names, column aliases or column "friendly names" associated with a column. For entities of type "cell value", candidates may be retrieved from a cell value index generated from metadata provided (as discussed) above for the various available datasets, may be used to identify column names using known distinct cell values (e.g., from String type columns) and cell value aliases. In some examples, the search service 211 allows for fuzzy queries based on the Levenshtein distance or other metric for measuring the difference between two sequences. Exact matches, tokenized versions of column or cell values (e.g., fields that include delimiters), and token synonym searches may be performed (e.g., "dod or day, day over day," "wow, week, week over week," "year to date, ytd," "date, day," etc.). In some embodiments, a column search may search both column and cell values, with column values boosted over cell values. Similarly, a cell value search may search both cell values and column values, with cell values boosted over column values. Candidate entity linkages returned by the search service 211 may be limited, in some embodiments, to a top X number of results per entity.

Named entity linking (NEL) component 203 outputs fine-grained information that connects the identified entities provided by the NER 202 to corresponding columns or cells for each table under the same topic. In some examples, the input to the NEL 203 includes one or more of the natural language query, user-specified entity linkages, and per-entity linkage candidates determined for recognized entities (e.g., limited to the top X number of linkage candidates). The search service 211 prepares candidates for each entity and NEL 203 selects the best one or skips all of them if there is not a potential linkage.

An example of a NEL prediction is:
Entities| Links
number of | None
attending| Col: Attending_Physn_NPI
operating| Col: Operating_Physn_NPI other| Col: Other_Physn_NPI
doctors| Col: Attending_Physn_NPI
state| Col: State
cancer| Cell: 1.0 (from Col: Is_Cancer)

Figure 3:
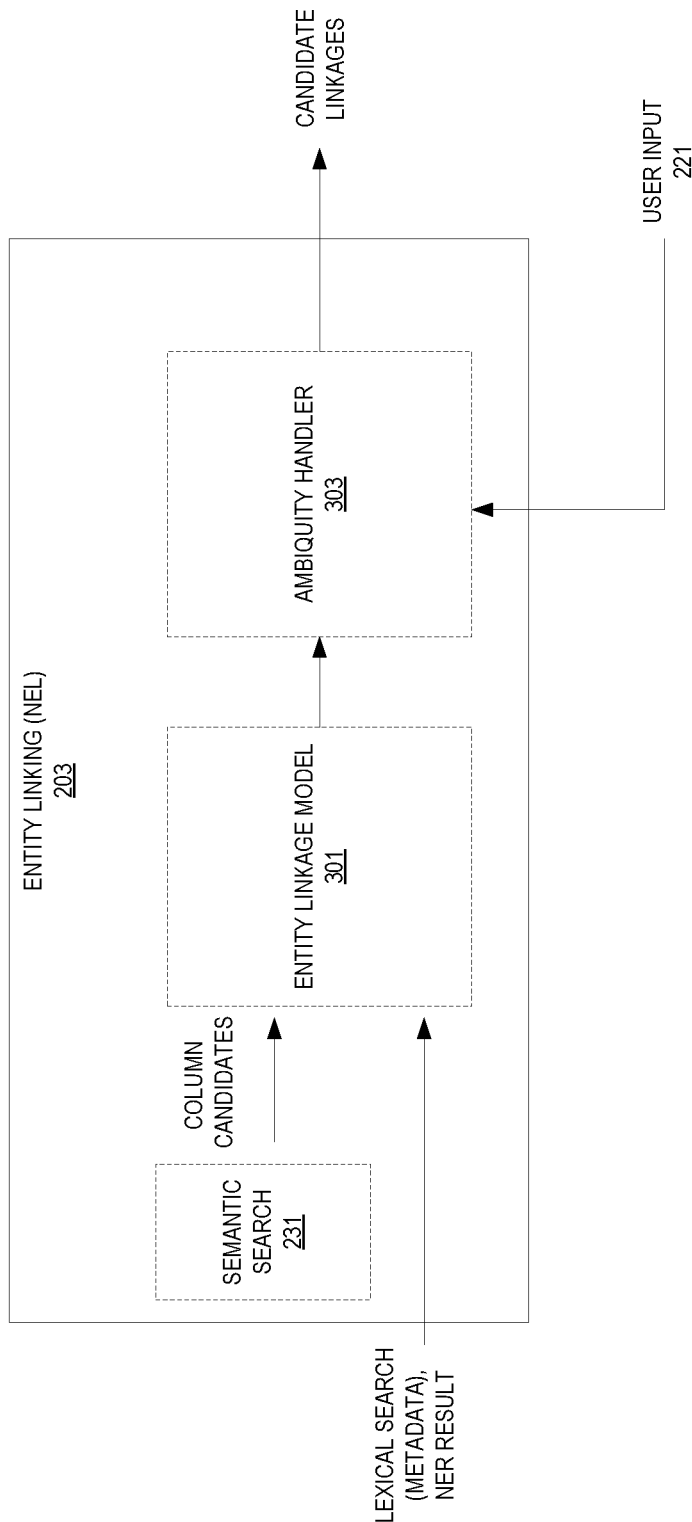
FIG. 3 illustrates examples of a NEL component.

FIG. 3 illustrates examples of a NEL component such as NEL 203. An entity linkage model 301 ranks (or re-ranks) all linkage candidates for each entity based at least on the context (e.g., metadata snapshot) to produce one candidate linked natural language query per potential dataset (e.g., 1 per distinct dataset across all entity link options) and, for each, picks the best link options of that dataset).

The entity linkage model 301 may be implemented as a deep learning model, utilizing a neural network trained to identify and rank entity linkages in a given query text string and other input data, in various embodiments. For example, entity linkage model 301 may be implemented according to the following stages. A first stage may be an encoder component (e.g., a BERT encoder component). For each linking candidate of an entity, an input to the entity linkage model includes one or more of: (1) the natural language query context; (2) the entity type; (3) column name if the candidate is a column or cell value if the candidate is a cell; and/or (4) the type of the column (if the candidate is a cell, the type of its corresponding column may be provided).

A linear layer may then be applied to the output of the encoder component to produce a logit score (e.g., a BERT score). During training, cross-entropy loss may be calculated on all the linking candidates, including one positive candidate and at most Y (e.g., 63) negative candidates. The positive candidate may come from the annotated ground truth, and the negative candidates may come from index search results. During inference, each linking candidate may be fed to the BERT model independently and may be assigned a BERT score.

A second stage of entity linkage model 301 may be a boosting model. The BERT scores, combined with other meta feature scores, may then be used as features for boosting classification models. The meta feature scores may include (1) the 3-gram character-level Jaccard distances between the entity text and the candidate text; (2) the 3-gram character-level Jaccard distances between the entity text and the candidate alias; (3) the 1-gram token-level Jaccard distance between the entity text and the candidate text; (4) the exact match score between entity and candidate texts; and (5) the binary indicator of whether one of the entity or candidate text is a subset of the other.

In various embodiments, the NEL component 203 implements an ambiguity handler 303. Ambiguity handler 303 may implement various ambiguity prompts and response handling including evaluating confidence scores to determine whether a minimum confidence threshold is achieved and, if not, prompting a user with multiple candidate linking options. In another example, the difference between a top-ranked candidate linkage and a next linkage may be determined and, if less than a threshold amount, cause prompts for candidate linkages to be made to a user so that the user can select another or confirm the top-ranked linkage for an entity. In some embodiments, ambiguity prompts (e.g., user input 221) may be made before processing of natural language query proceeds to dataset selection model 205 (e.g., if an entity has not candidate linkage for a dataset above a minimum confidence threshold). In some embodiments. ambiguity prompts may be provided along with a natural language query result, which may provide a user with an opportunity to refine the query result by providing a selection, which may cause processing of the natural language query using the selection.

The approached described to this point has relied on lexical queries to retrieve metadata, etc. for the NLQ. A lexical search method (e.g. BM25) attempts to match token-based and/or sub-token ("fuzzy") matches of the query words to metadata and has a deterministic behavior, but does not understand the semantic meaning of the query. That is for each entity mention detected by the NER 202 a lexical search is performed to retrieve a limited number of column candidates. For example, in the NLQ of "Who is the leader in blocked shots" the mentions of "who" and "leader" should be linked to a column of "Player." However, since "Player" does not have a lexical match with either "who" or "leader" it is not received by the lexical search service 211 and will not show up in the candidate list for ranking (or reranking).

A semantic search attempts to understand the intent and contextual meaning of a query and can provide context for entities that have less overlap with the query but semantically similar (e.g. pet is contextually similar to cat, soccer is contextually similar football, etc.). In some examples, the NEL 203 includes semantic search 231 functionality to select a set of linkable candidates from a database schema (e.g., a second set of linkable candidates with the lexical search providing the first set of linkable candidates). In some examples, the second set of linkable candidates is only columns of a database schema. A motivation of adding a semantic search component is to increase the recall of retrieved column candidates for NEL ranking or reranking. Without semantic information some candidates will not be found, but by using a semantic search semantically similar candidates can be retrieved. In examples that use a semantic search, column candidates retrieved by a lexical search and a semantic search are combined and used by the NEL 203. Combining lexical and semantic searches, in particular in some examples with some constraints and rejection of low-confidence semantic candidates improves the final accuracy of the NLQ processing. As such, the use of semantic and lexical searches improves the technical field of NLQ processing.

In some examples, a semantic search component is put inside the NEL 203 package and will be used for column entities. In some examples, the search service 211 includes a semantic search capability 233 (e.g., a K nearest neighbors (kNN) search functionality of the search service 211 may be used for semantic searching).

The functionality performed by the search capabilities 231 and 233 is similar if not identical.

Figure 4:
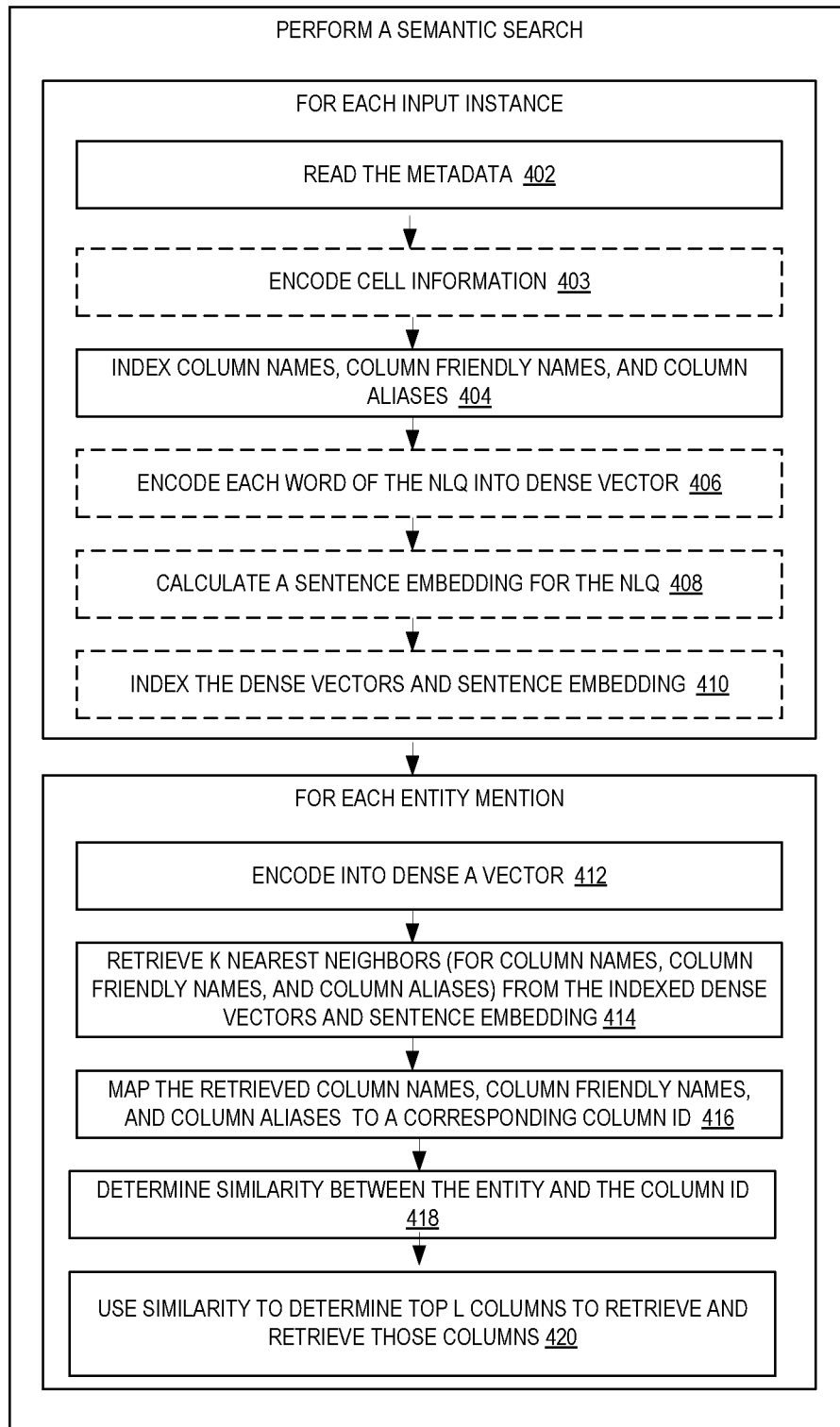
FIG. 4 is a flow diagram illustrating operations of a method for performing a semantic search for a NLQ according to some examples.

FIG. 4 is a flow diagram illustrating operations of a method for performing a semantic search for a NLQ according to some examples. Some or all of the operations (or other processes described herein, or variations, and/or combinations thereof) are performed under the control of one or more computer systems configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some examples, one or more (or all) of the operations are performed by the semantic search 231 and/or 233 of the other figures.

In some examples, the semantic search is a vector-based search that finds a numerical representation of the NLQ, indexing the NLQ in a high-dimensional vector space and measuring how similar a query vector is to a set of indexed data.

In some examples, for each input instance (e.g., NLQ), a plurality of acts is performed. Metadata is read at 402. For example, topic metadata 217 is read. Note this happens during a lexical search in some examples.

In some examples, cell values from the metadata are encoded into vectors at 403. In some examples, this encoding is performed when the semantic search is a part of a search service such as semantic search 233.

Column names, column friendly names, and column aliases of a database schema (e.g., structured dataset 215) as proved by the metadata are indexed at 404. In some examples, encoded cell information is also indexed.

In some examples, each word of the NLQ is encoded into a dense vector at 406. That is each word is encoded into its own vector. In some examples, a fastText encoder is used to generate the vectors. However, other encoders may be used such as a BERT embedder.

In some examples, a sentence embedding for the NLQ is calculated at 408. In some examples, a mean pooling is used for this calculation. However, other embedding calculation approaches may be used.

In some examples, the dense vectors, cell value vectors, and/or sentence embedding are also indexed at 410. In some examples, the indexing is performed using Facebook AI Similarity Search (FAISS). These values allow for similarity comparisons to the metadata and NLQ.

For each entity mention, found during the NER, a plurality of acts is performed. The entity is encoded into a dense vector at 412. K nearest neighbors (kNN) (comprising column name/friendly name/aliases) are retrieved from the index (e.g., column information and/or dense vectors and sentence embedding) based on the dense vector for the entity at 414. In some examples, cosine similarity is used to determine what is to be retrieved.

Each retrieved column name, column friendly name, and/or column alias is mapped to a corresponding column ID at 416, and the similarity between a mention and a column ID is determined at 418. In some examples, the similarity is the maximum similarity between the mention and the column name/friendly name/aliases. In some examples, the similarity is determined using cosine similarity. However, other similarity schemes may be used.

The determined similarity is used to determine the top L columns to retrieve and those columns are retrieved at 420. Note that with the lexical search that is also to be performed to retrieve a first set of linkable candidates, the result of the semantic search is a second set of linkable candidates.

In some examples, to reduce an impact on latency and minimize the risk of adding extra noise to the candidate list, a first type of strategy is used for combining two kinds of candidates. In particular, k semantic search candidates are only added when the lexical search from the search service 211 candidate list is empty.

In some examples, a rejection threshold is used to filter out noisy semantic search candidates. For example, a score for the candidate is calculated and the score does not meet a threshold it is thrown out. In some examples, a Transformer-based model is to generate the score. The threshold may be based on cosine similarity, L2 distance, etc.

As noted above, the NER 202 identifies entities within a question and the NEL 203 ranks (or reranks) linking candidates for each entity retrieved using the search service based on context. However, the relations between entities may not be captured which may lead to less accurate results.

Leveraging relations among entities can help a semantic parser or search. For example, to match the multiple columns with corresponding cell values, understanding the relations among entities can help with the creation of an intent representation correctly. Additionally, relations among entities can provide additional information for the entity linking model 301. Using relations improves accuracy on questions that contain discontiguous entities, helps with the parsing multiple values and columns pairs, and helps the entity linking model 301 to link candidate columns. As such, extracting relationships is an improvement to the technical field of NLQ processing.

In some examples, a relationship extraction (RE) model 241 is used to identify relations among entities. RE is the task of extracting semantic relationships from a text. Extracted relationships usually occur between two or more entities of a certain entityType (e.g., Column, Value, etc.) and fall into a number of semantic categories (e.g., Filter, Discontiguous, RelatedTo, etc.).

The table below provides examples of use cases where RE is beneficial:

|  | Use case 1 |
|---|---|
| NLQ | when was the last time a player had less than 2 hits and more than1 strikeout |
| Issue | "hits" and "strikeout" are columns, and "1" and "2" are values; when generating intent representations it can be hard to match correct pair in multiple pairs |
| Relation | R_NUMERIC_RANGE: {(hits, 2), (strikeout, 1)} |
|  | Use case 2 |
| NLQ | Out of all claims that started in March 2008, how many ended in April 2008? |
| Issue | Intent representation generation may ignore output from NEL when there is two DATE_RANGE_FILTER mapping to different date columns (start date and end date) |
| Relation | R_DATE_RANGE: {(start, March 2008), (end, April 2008)} |
|  | Use case 3 |
| NLQ | treatment success rate for patients with age under 20 vs under 30 vs under 50 |
| Issue | Users want to ask questions where 1+ metrics needs to be compared across 2+ groups where each group is defined by a (set of) filters |
| Relation | R_VALUE_VERSUS: {20 <--> 30 <--> 50} R_NUMERIC_RANGE: {(age, 20), (age, 30), (age 50)} |
|  | Use case 4 |
| NLQ | What is managed service and self-service Spend by locale for 2019 and 2020? |
| Issue | The topic table contains columns '2020 SS Spend', '2019 MS Spend' which is corresponding to the discontiguous entities (2020, self-service, Spend), (2019, managed service) respectively. Such relation can be captured by the RE model. |
| Relation | R_DISCONTIGUOUS: {(2020, self-service, Spend), (2019, managed service)} |

The input into the RE model 241 is context information (e.g., the NLQ and some additional information) and a pre-defined relation dataset and the output of the NER 202. The output of the RE model 241 is the relations between pairs of entities detected from the NER 202. These entity relations are also provided to the NEL 203 to help link candidates with columns and/or intent representation generation 207 to help the intent representation generation 207 with potential issues such as those detailed above.

In some examples, the pre-defined relation dataset is constructed based on use cases. In some examples, the pre-defined relation data set comprises at least one of the following relations: R_DATE_RANGE, R_DATE_RANGE_INV, R_DISCONTIGUOUS, R_FILTER_CONTAINS_FALSE, R_FILTER_CONTAINS_FALSE_INV, R_FILTER_CONTAINS_TRUE, R_FILTER_CONTAINS_TRUE_INV, R_NUMERIC_EQUAL, R_NUMERIC_EQUAL_INV. R_NUMERIC_RANGE, R_NUMERIC_RANGE_INV, and/or no relation.

"INV" refers to an inverse relation. The RE model 241 is able to predict every pair of entities detected from the NER 202 by using inverse relationships. For example, if two entities have asymmetric relations, like <Entity A. R_NUMERIC_RANGE, Entity B>, the RE model 241 will output both <Entity A, R_NUMERIC_RANGE, Entity B> for Entity A and <Entity B, R_NUMERIC_RANGE_INV, Entity A> for Entity B. If no relation exists between entities C and D, the RE model 241 will output <Entity C, no relation, Entity D>.

The RE model 241 is trained to identify relationships among entities within a query. That is given a sentence(S) and two tagged entities ($E_1$ and $E_2$) in a sentence, the task is to determine the relation between the tagged entities with the relation rɛR where R is the pre-defined relation set. In some examples, an encoder of the RE model 241 modifies the input sentence (NLQ) by adding position tokens (e.g., "[ms]" and "[me]") for a head entity and position tokens (e.g., "(("and"))") for a tail entity:

$S=[x_0, \ldots [ms], x_i, \ldots, x_{j-1}, [me], \ldots (x_k, \ldots, x_{i-1}), \ldots x_n]$ where $S_{1k}=(i,j)$, $s_2=k,l$ denote span mentions of head and tail entities respectively.

A decoder of the RE model 241 pools the embeddings of "[ms]" and "((" as a prediction. In some examples, the loss of the RE model 241 is performed using cross-entropy. In an output layer, a classification layer classifies pairs of entities into the pre-defined relation set. For a pair of entities without a valid relation, a "no_relation" label is assigned. In some examples, to further improve performance, the RE model 241 is trained to be entity type aware with the entity type generated by the NER 202 concatenated to the original entity.

Figure 10:
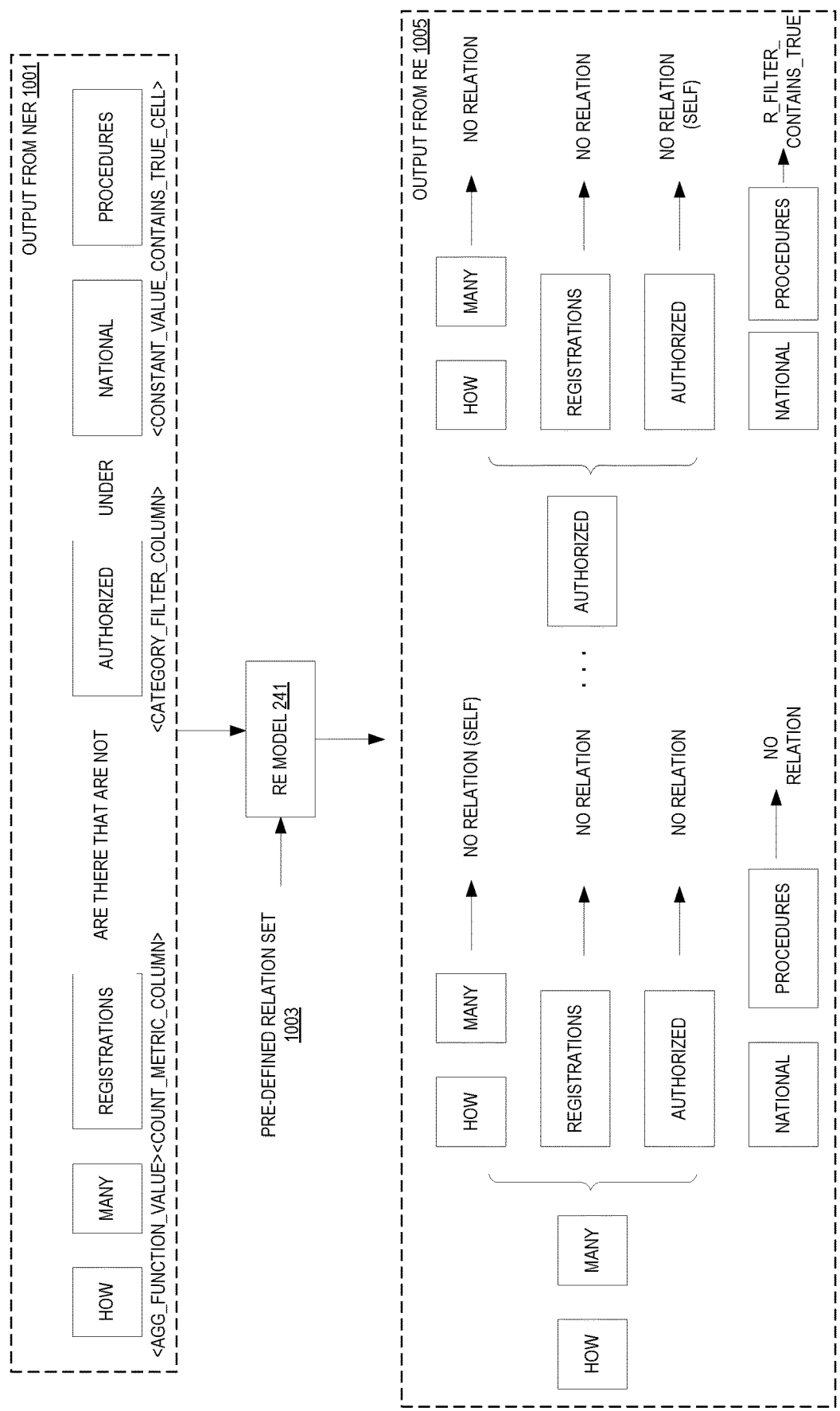
FIG. 10 illustrates examples of relating entities.

FIG. 10 illustrates examples of relating entities. In this example, the NLQ is "How many registrations are there that are not authorized under national procedures." In this example, the NER 202 determined that there are four entities: 1) how may; 2) registrations; 3) authorized; and 4) national procedures as shown in the output from NER 1001. Additionally, each entity has an associated entity type (<AGG_FUNCTION_VALUE>, <COUNT_METRIC_COLUMN>, <CATEGORY_FILTER_COLUMN>, and <CONSTANT_VALUE_CONTAINS_TRUE_CELL> respectively).

The output from the NER 1001 is provided to the RE model 241 along with a pre-defined relation set 1003. The RE model 241 determines relations between each entity and outputs those relations as a part of its output 1005. Each entity is evaluated against for the entity itself and the other entities. For example, the evaluation of the "how many" entity to the other entities shows that there are no relations. However, for the entity "authorized" is has a relation of "R_FILTER_CONTAINS_TRUE" (one of the pre-defined relations of the pre-defined relation set 1003). Note that each entity is evaluated and, in some examples, an inverse relationship is also evaluated.

Figure 11:
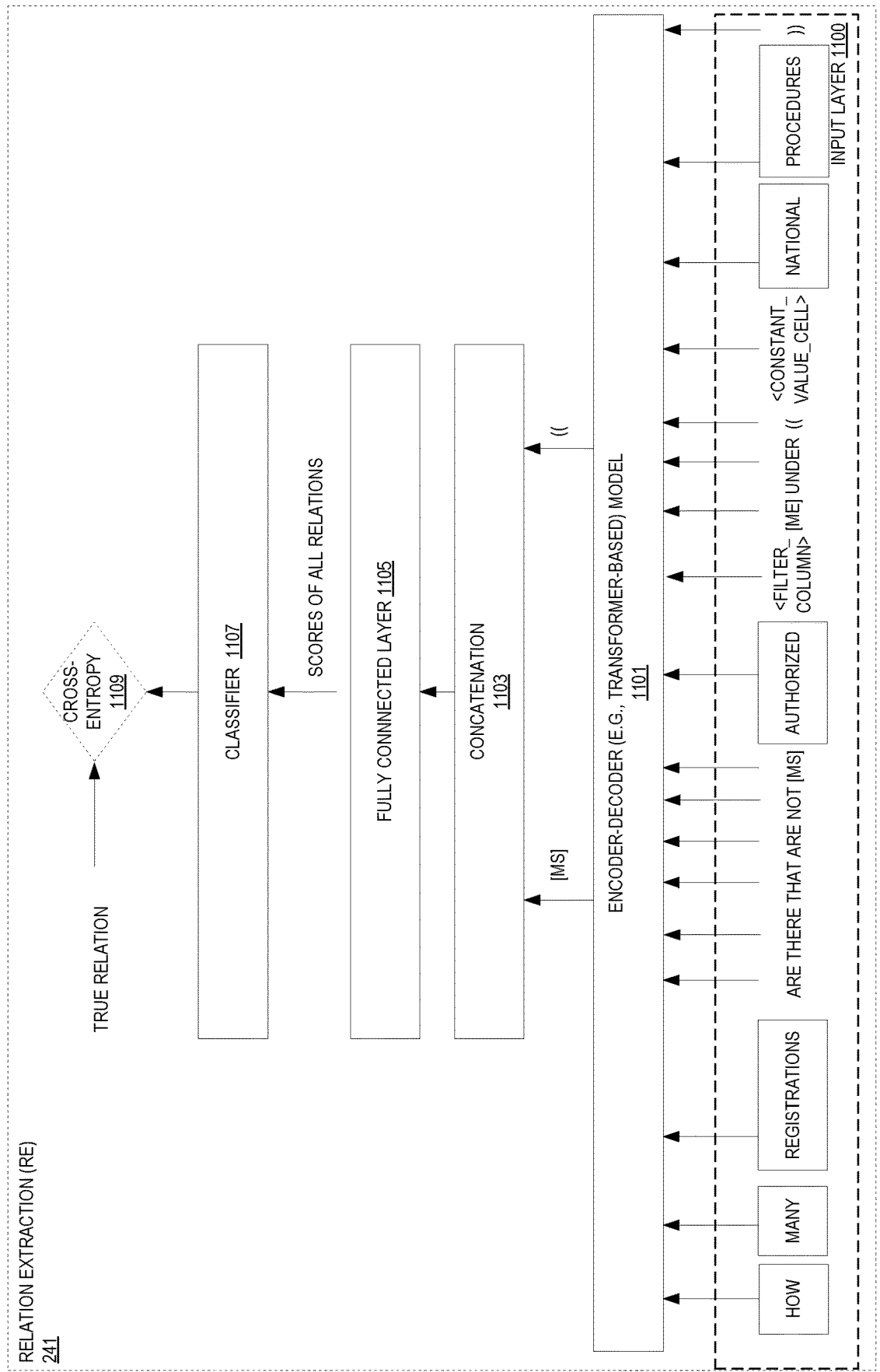
FIG. 11 illustrates examples of an entity relation model and its usage.

FIG. 11 illustrates examples of a RE model and its usage. For example, in some examples this depicts RE model 241. An input layer 1100 adds position tokens (special tokens) to the output of the NER to generate a modified NER output. In this example, the entity "authorized" is being evaluated. Additionally, as shown, entity type information is added.

Figure 12:
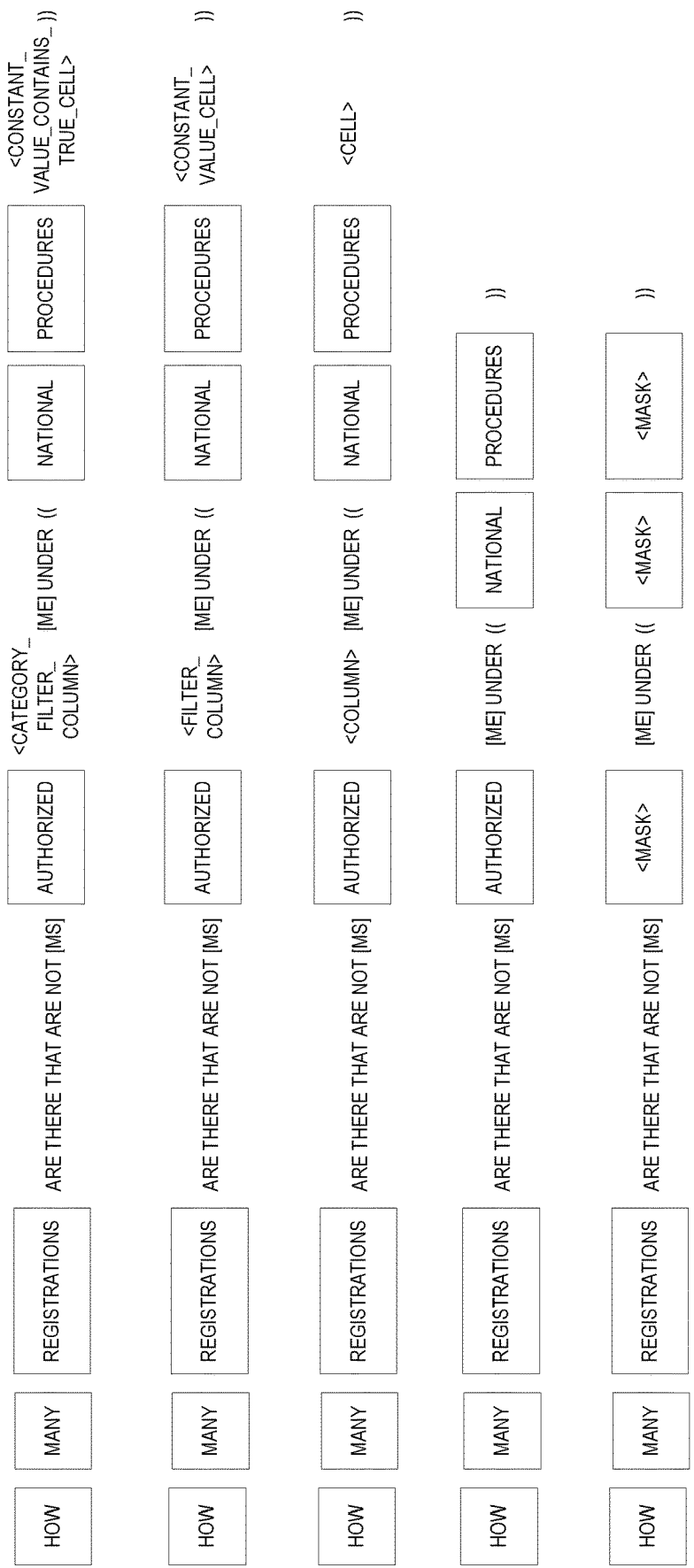
FIG. 12 illustrates examples of the "level" of entity related information provided to an entity relation model.

FIG. 12 illustrates examples of the level of specificity of entity type information to be added. In some examples, each entity's type information is added. In some examples, only a subset of entity's have their type information added. Note that for each entity a different modified NER output will be examined in some examples.

In this example, an encoder-decoder model (e.g., a Transformer-based model such as DistilBERT 1101 takes in the modified, tokenized NER output and embeddings of the special tokens are selected. Note that the Transformer-based model 1101 is an example and other models may be used (e.g., other S2S models). The embeddings are pooled by concatenating (using concatenation 1103) the embeddings of [ms] and "(("which are fed into a fully connected network (FCN) 1105.

The FCN 1105 outputs scores for all relations of the pre-defined relation set. In some examples, the FCN 1105 performs linear activation or layer normalization. In some examples, the type of act is selectable. The output of the FCN 1105 is fed to a classifier 1107 which predicts a relation. In some examples, the scores and true relations are used to optimize the model via cross-entropy loss 1109 during training.

FIG. 12 illustrates examples of the "level" of entity related information provided to the RE model 241. In this example, going from the top level to the bottom level the amount of entity-related information lessens. At the top level, an entity and entity type are provided. In the next level, coarse-grained the entity and entity type information is used. In the next level, the entity and column/cell/unknown entity types are used. In the next level, only the entity is used. And in the lowest level, only masked entities are used.

User input 221 (also called user disambiguation in some examples) is provided from an interface (such as a graphical user interface (GUI)) for a user to adjust NER and NEL predictions. The primary usage cases include: 1) NEL prompts the user with a hard disambiguation request because a top ranking candidate has a low score; 2) users notice an extra term being used in the intent representation that they do not want; 3) a 2nd NER/NEL inference is made when a user changes its request (e.g., modify the span).

Dataset selection (DSS) 205 selects the top-k datasets from NEL predictions. Dataset selection model 205 in some examples implements a deep learning model that utilizes a neural network to rank linked datasets such that the top K datasets can be selected. For example, given linked entities from entity linking prediction, the DSS 205 extracts a subset of datasets that were linked. For each candidate dataset, the DSS 205 may then use a denoising autoencoder for pre-training sequence-to-sequence models (e.g., a fine-tuned BART encoder to encode the (1) NLQ (natural language query) and (2) Column names.

A linear layer may then be applied for projection. Finally, a softmax may be used on the logit scores of all datasets, and compute scores for each candidate dataset. During training of the DSS 205, negative random samples (e.g., four) may be gathered for each positive training example, and cross-entropy loss may be used to boost the scores of the positive candidates. The DSS 205 may then filter down the set of datasets to make predictions over during the intent representation generation model phase thereby managing latency; but the output of the DSS 205 score can also be used in conjunction with an intent representation generation model 207 score, in some embodiments, to produce a ranked (or reranked) ordering of predictions to improve end-to-end accuracy.

In some examples, the intent representation generation model 207 leverages a grammar-based decoder to generate an intent representation based on the question, dataset schema, and the NER/NEL/DSS predictions. In some examples, its encoder is the encoder of BART-Large in some examples. Its decoder selects grammar rules step-by-step based on a encoder representation (NLQ+Schema) and logical constraints from upstream information.

In some examples, linkages with selected datasets are provided to the intent representation generation model 207 along with a dataset metadata snapshot to provide an intent representation of the natural language query. The intent representation generation model 207 is responsible for predicting the intent representation given the natural language query and upstream predictions from NER 202, entity linker 203, and dataset selection model 205. In at least some embodiments, the intent representation generation model 207 generates multiple intent representations of natural language query with corresponding scores, takes a top X number of intent representations according to the corresponding scores, and selects a best scoring one of the intent representations to return as the intent representation.

In at least some examples, the intent representation generation model 207 predicts the intent representation tree structure based on the predicted linked entities and tables from upstream algorithms. The intent representation generation model 207 includes three main components: (1) Encoder, (2) Top-down Decoder, and (3) Bottom-up business logic constraint in some examples. The intent representation generation model 207 may be responsible for encoding the natural language query and schema information. Specifically, the textual inputs: (1) natural language query and (2) Column Names may be encoded with a pre-trained encoder (such as a BART encoder). All the inputs may be concatenated together with a SEP token as separator. The encoded representation may then be consumed by a Transformer decoder.

During inference, the entity linkage model 301 linked columns and named expressions may be prioritized in the encoder to alleviate out-of-bound issue due to fixed length limits of the LM encoder. Specifically, the entity linkage model 301-linked columns may be first appended and then append the remaining columns if the length limit of the LM encoder allows.

The top-down decoder of intent representation generation model 207 may be implemented so that the representations of columns and entities from the encoder are extracted, and then concatenated with grammar embeddings. Thus, the target embeddings consists of: (1) Grammar representation, (2) Column representation, and (3) Entity representation. These target embeddings correspond to action vocabularies, and they represent the possible actions that the decoder can take at each step.

At each decoding step, the intent representation generation 207 decoder uses one of the three following components in some examples.
1. Grammar-based decoder: The grammar-based decoder chooses a production rule among one of the dynamic grammar production rules. These dynamic grammar production rules are extracted from the training data. During inference, the transformer decoder would then compute the output token/action probability of each production rule among the above rules with other rules masked out. During training, all action vocabularies are available for the decoder to choose from, with a pointwise cross-entropy loss on each action step. 2. Column CopyNet: When the decoder expands a COLUMN node, the transformer decoder uses a "copy mechanism" to choose the column. The encoded tokens of each column are mean-pooled and projected with feed-forward layer to form the column-action portion of the output token embedding matrix. During column expansion step, the transformer decoder computes the output token/action probability, which represents the probability of copying the corresponding column. 3. Value CopyNet: Similar to Column CopyNet, a copy mechanism is used to assign values in the intent representation. Possible values are extracted from AES/NEL linked values.

An example of an output of the intent representation generation model 207 is:
Filters
    constant
    constantType: SINGULAR
    value: '1'
    filterType: NUMERIC_EQUALITY_FILTER
    operandField: 200d0600-590c-421a-$a$3dc-6848ce0cd3b5.ColumnId-16 (Is_Cancer) groupByList
    fieldId: 200d0600-590c-421a-$a$3dc-6848ce0cd3b5.ColumnId-7 (State) metrics
    operands: Attending_Physn_NPI, function: DISTINCT_COUNT
    operands: Operating_Physn_NPI, function: DISTINCT_COUNT
    operands: Other_Physn_NPI, function: DISTINCT_COUNT The bottom-up business logic constraints of the intent representation generation model 207 allows for business logic to provide hard constraint and hints based on schema information (e.g. column type) and entity recognition model 202 and NEL 203 predictions. Note that this business logic may only be used during inference, in some embodiments. For example, during training, the NLQ2IR model may not be constrained or provided with hints on the search space. It may be allowed to learn to generate the parse tree without these constraints and hints. Thus these business logic rules may not hurt the generalizability of the trained model.

In the following example, the NER 202 labeled a mention with COUNT_METRIC_COLUMN and the NEL 203 linked it to column total_sd. The business logic on aggregation-metric-column component would impose several constraints during decoding:
1. Decoded AST must have a Metrics node
2. Since the aggregation type of the NER 202 entity type is COUNT, the decoded AST must have a COUNT node as one of Metrics' children
3. Since the NEL 203 linked the entity to the column total_sd, the decoded AST must have a leaf column node total_sde with ancestors Metrics→COUNT A visualization component 209 at least generates a visualization for the intent representation (or a formatted version for the logic to utilize). For example, the visualization component 209 may understand and generate corresponding requests to obtain data from different database service(s), data storage service(s), or other service(s) according to the corresponding interfaces supported by those services (e.g., query language, API, protocols, etc.). The visualization component 209 performs various data processing operations to determine generate requested results (e.g., applying various aggregation, statistical analyses, or other operations) in some examples. The visualization component 209 may also be able to determine the type of visualization to provide the results (e.g., bar graphs, charts, or other displays, that illustrate the requested analysis.

In some examples, the pipeline approach described with respect to at least FIG. 3 does not provide desired results. In particular, the above described intent generation model 207 generates intent representations based on the query, one or more dataset schemas, and predictions from the NER 202, NEL 203, and DSS 205. The decoder of the intent generation model 207 selects grammar rules based on its encoders representation generated from NLQ and database schema.

A potential area of weakness in the pipelined approach is that when a span matches a column name, but does not have corresponding components in a ground truth intent representation, the NER 203 tends to predict such spans to be entities.

Another potential area of weakness of the pipeline is fuzzy matching. When entity mentions are not exactly matched with their corresponding cell values or column names it can cause some issues for the pipeline approach.

To address at least these two potential areas of weakness, a S2S model approach may be used. The S2S model predicts intent representations as a sequence. As such, the S2S model approach will ignore spans to give the correct intent representation prediction (thus performing better on handling spans). Additionally, a S2S model is able to perform fuzzy matching. In part, this may be due to the sheer size of a typical S2S model. Additionally, in some examples, the S2S model is pre-trained (leveraging existing models), but fine-tuned based on a schema, etc. As such, the increased accuracy of using a S2S model improves the technical field of NLQ processing.

Figure 5:
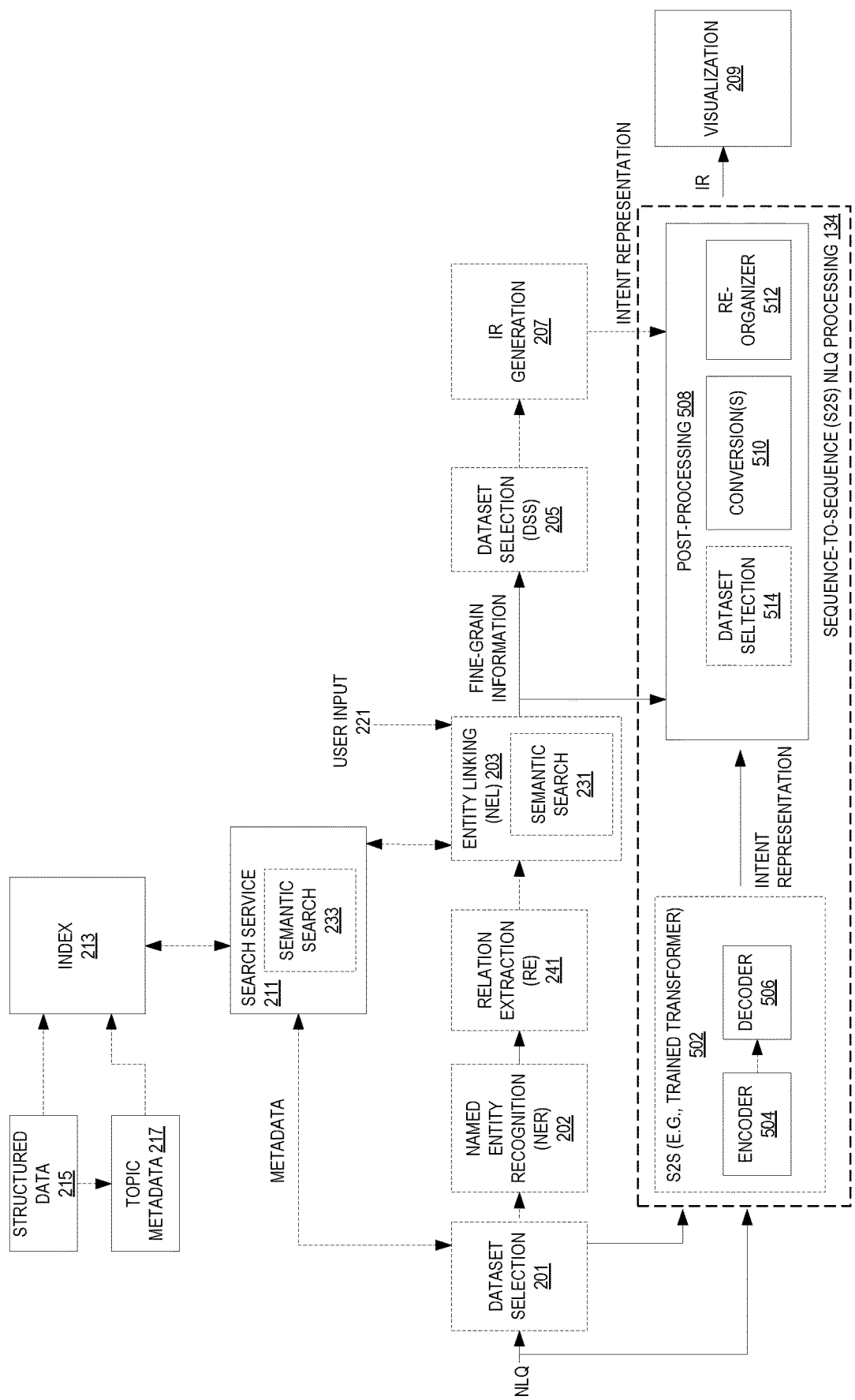
FIG. 5 illustrates examples of a sequence-to-sequence (S2S) approach to NLQ response generation.

FIG. 5 illustrates examples of a S2S approach to NLQ response generation. In some examples, only the S2S model 502 is used. That is the S2S model 502 gets rid of fine-grained information in the previously discussed pipeline. To train the S2S model 502 NLQ-IR pairs are used. Specifically, a NLQ and a schema are provided as input, a serialized intent representation is generated as an output, and a pre-trained encoder-decoder architecture is fine-tuned.

In some examples, a hybrid approach uses some aspects of the above described pipeline in addition to the S2S. In this figure, elements of FIG. 2 that have the same or similar functionality maintain those labels.

The S2S model 502 (e.g., a trained Transformer such as a T5 model) takes in the NLQ and metadata (e.g., provided by the search service 211).

In some examples, the input to the S2S model 502 comprises a NLQ and schema (e.g., metadata in the form of one or more of sorted column names (e.g., physical type, semantic type, cell value candidates, selected alias, etc.), sorted named entities (e.g., entity description, selected aliases, etc.), sorted named expressions (e.g., physical type, selected alias, etc.), and sorted named filters (e.g., filter type and selected alias, etc.)). In some examples, the "selected alias" content is generated by removing alias(es) that are substring of the original names. For example, if the original column name is "email campaign ID" one of the aliases could be "campaign ID", but as "campaign ID" is a substring of the original column name "campaign ID" will be removed because of the substring relationship.

In some examples, the metadata data is sorted. In some examples, a layer of the S2S model 502 performs the sorting. In some examples, the search service 211 performs the sorting. Metadata sorting may be based on fuzzy matching between a NLQ and concatenated name and aliases, for example, given a column with name 'pre-specified adverse event' and aliases ['prespecified', 'specified earlier'] where a similarity (fuzzy matching) score is calculated as fuzzy.ratio (NLQ, 'pre-specified adverse event prespecified specified earlier'). In some examples, cell value candidates are also sorted based on the fuzzy matching score against the NLQ.

In some examples, the NLQ and schema (e.g., columns, named entities, named expressions, and named filters) are separated with "|", all other information within parenthesis is separated with a ",".

In some examples, a maximum sequence length is applied to the S2S model 502. In some examples, a ranker is used to select a top K schema items.

In some examples, during training, values are extracted from each gold intent representation and merged for the same schema as cell value candidates.

A specific example of an input is shown below:

NLQ and Schema: how many pre-specified non-fatal adverse events persisted for more than a day?| pre-specified adverse event (attribute, pre-specified, not specified, false, true, yes, no, prespecified, specified earlier); start date/time of adverse event (time, event started, adverse event started); end date/time of adverse event (time, event ended, adverse event ended); adverse event id (integer, adverse effect, subject, adverse reaction, adverse events); study day of end of adverse event (integer,); category for adverse event (attribute, stomach issues, heart issues, body pain, eye issues, body pain, category, classification); preferred/modified reported term (attribute, heart failure, back pain, vomiting, nausea, preferred term, pt, type of adverse event, adverse event, adverse reaction, adverse effect, types of adverse reaction); outcome of adverse event (attribute, not recovering/not resolving, recovered/resolved, did not recover, not recovering, recovering/resolving, recovered,); congenital anomaly or birth defect (attribute, had birth defect, diagnosed with birth defect); concomitant or additional treatment given (attribute, additional treatment given, additional treatment not given, false, true, yes, no, additional treatment given); study day of start of adverse event (integer,); end relative to reference period (attribute,); pattern of adverse event (attribute, single event, intermittent, continuous,); duration of adverse event (integer,); unique subject id (attribute, subjects, patients, participants, people, cases); involves cancer (attribute, had cancer, diagnosed with cancer); body system or organ class (attribute, musculoskeletal and connective tissue disorders, gastrointestinal disorders, nervous system disorders, vascular disorders, eye disorders, body system, soc); action taken with study treatment (attribute,); requires or prolongs hospitalization (attribute, did not require hospitalization, prolong hospitalization, requires hospitalization, false, yes, true, long time in hospital, additional time in hospital); other medically important serious event (attribute, yes, true, y, 1.); persist or significant disability/incapacity (attribute, significant disability); relationship to non-study treatment (attribute, might be related to aspirin use,); results in death (attribute, participants death, non-fatal, fatality, mortality, non-fatal, perished,); occurred with overdose (attribute, drug overdose, overdose, y.); location of event (attribute, head, back,); severity/intensity (attribute, severe,); is life threatening (attribute, life threatening, y,); serious event (attribute, non-serious, severe, serious, y, n.); causality (attribute, unlikely related, possibly related, not related, related,); study id (attribute, abc123, abc456, abc789.); group id (integer.); epoch (attribute, treatment 1, screening, treatment 2,); count_of_adverse_events (integer, adverse events, adverse reaction, participants); percentage_of_severe_events (number, percent of severe adverse reactions, percentage of severe adverse events); percentage_death_no_overdose (number, percent of subject, percentage of subject, death percentage of subjects); q-% total_adverseevents (number,); q-rlf-countadverseevents (integer,); q-adverseeventdetails (integer,); percentage_of_prespecified (number,); count_of_subject_id (integer,); q-ranklimit-subjectid (integer,)

The output of the S2S model 502 is an intent representation with additional information. This additional information is, in some examples, one or more of: metrics (e.g., function, operands, alias_id, etc.), groupByList (e.g., fieldId), filters (e.g., filter type, [function], operand Field, value, [reverse], etc.) and visual (e.g., type). The groupbylist is a grouping of items by a property.

In some examples, different filters may have different formats. Examples of different formats are shown below:
  CATEGORY_FILTER+function+operandField+value+reverse
  NUMERIC_EQUALITY_FILTER+operandField+value
  DATE_RANGE_FILTER+operandField+range value+timeGranularity
  NUMERIC_RANGE_FILTER+operandField+range value
  RELATIVE_DATE_FILTER+function+operandField+lastNextOffset+timeGranularity
  TOP_BOTTOM_FILTER+operandField+topBottomLimit
  RANK_LIMIT_FILTER+operandField+topBottomLimit+sortDirection Two examples of output from the S2S model 502 are shown below:
  metrics::function:sum, operands:total_author, aliases: xxxxxx_0; | groupbylist::fieldid: end_iso_week_date; |filters::filtertype:category_filter, function:contains, inverse: false, operandfield:territory_segment, value: ent; | visual::type:kpi_value_trend; metrics::function: sum, operands:volume, aliases:xxxxxx_0; | groupbylist::| filters:: filtertype:category_filter, function: contains, inverse: false, operandfield: company, value: just energy; filtertype:date_range_filter, operandfield: date, range: minimum 2020 Jan. 1 00:00:00 +00:00 maximum 2021 Jan. 1 00:00:00+00:00, timegranularity:year; filtertype:category_filter, function:contains, inverse:false, operandfield:trade_type, value: buy; | visual::type:kpi;

In some examples, a post-processing stage 508 is applied to the output of the S2S model 502 (one or more intent representations) as the model may have difficulty learning mappings. In some examples, fine-grained information from the NEL 203 is also provided as input to the post-processing. Post-processing may include one or more of re-organization, conversion, dataset selection, and/or intent representation selection.

For example, some metadata can be better utilized during post-processing and is/are subjected to conversion(s) 510. In some examples, Boolean columns with an INTEGER physical type (1 or 0) should be used in NUMERIC_EQUALITY_FILTER and if it occurs in CATEGORY_FILTER with yes/no values, it is converted from CATEGORY_FILTER to NUMERIC_EQUALITY_FILTER. In some examples, when "ID" is contained in column name, and the column's physical type is INTEGER, the metric function is converted from "COUNT" to "DISTINCT COUNT".

In some examples, the output is subjected to a re-organizer 512. For example, a date format string "YYYY-MM-DD HH:mm:ss ZZ" may be converted to integers for a numeric range filter, when the prediction is a named filter, the prediction is converted to the corresponding filter format, when the prediction is cell value alias, it is converted to the original cell value (e.g. 'mobile app'→ 'mobile applications') which will help ensure questions are answered correctly and consistently, etc.

In some examples, a dataset selection is performed by the S2S 502 (requiring no post-processing for dataset selection. In some examples, S2S 502 is run per dataset and a selection is made using a DSS 514 which operates similar to DSS 205. This selection may be made based on confidence score. In some examples, the DSS 514 uses a scoring module to score each dataset and those scores are multiplied by the intent representation probability and a selection is made based on the results of those multiplications.

In some examples, the pipeline portion works better for certain queries. For example, the S2S model 502 is good at ignoring some domain filler words. However, it may also make mistakes on missing some obvious components. As such, in some examples, a hybrid model is used. That is portions of the pipeline are used along with the S2S model 502. Those pipeline portions are illustrated in FIG. 5. In particular, NER/NEL information may be used during post-processing 508.

In some examples, one or more of the following rules are applied during post-processing 508.
  1. For cell values in CATEGORY filter, the S2S model 502 predictions are replaced with NEL predictions.
  2. If the S2S model 502 and NER 202/NEL 203 both identify one GROUPBY_COLUMN from a NLQ, the S2S model 502 GroupBy column is replaced with the NEL 203 GroupBy column.
  3. If S2S model 502 predicts one GroupBy column, but NER 202/NEL 203 predicts two GroupBy columns and the NEL203 link score is higher than a threshold, an extra GroupBy column is added to final prediction.
  4. For DATE_RANGE_FILTER, if NER 202 predicts the entity types like 'MONTH_DATE_EQUAL_VALUE' and 'DAY_DATE_EQUAL_VALUE', the S2S model 502 cell value predictions are replaced with NEL 203 predictions.
  5. For DATE_RANGE_FILTER, if the predicted column has physical type 'ATTRIBUTE' and NER has 'CONST_VALUE' for that column, this DATE_RANGE_FILTER is converted to CATEGORY_FILTER.

In general, the pipeline approach works better when an intent representation component is missing, a date column selection is incorrect, relations between filter columns and/or filter values is incorrect, for minimizing hallucinations, when filter values are incompatible with filter columns, when there is ambiguity in a dataset, and/or when the date ranger filters are complicated.

Choosing the right date column for date related intents is very challenging, especially when multiple date columns are provided in a given dataset. Usually, there is no explicit clue from questions on which date column is better. Therefore, it is necessary to bring a human into the loop to assist ML models. In the pipeline approach, a user disambiguation is used to provide relevant date columns to users and let users make the decision based on their requirements. However, it may be hard to provide this function in the S2S model 502.

When there is more than one filter in a question, ML models need to figure out which filter values should associate to which columns. The pipeline approach is able to predict the right filters based on the explicitly detected relations (e.g., based on a distance-based relation or a model-based relation extraction).

Hallucination is a notorious issue for generative models. A S2S model 502 may predict some cell values that are not mentioned or related to the questions. The pipeline approach only predicts the cell values based on the entities detected from the questions and thus does not have this issue.

Usually, there are many similar columns/cell values in the same dataset. It is very hard for models to figure out which one should be used. In this scenario, the pipeline approach will provide these candidates for users to disambiguate. However, the S2S model 502 model may simply choose that based on its confidence scores.

When various types of date related filters are supported such as "before May 2022"/"after May 2022"/"since May 2022"/"in May 2022" and it can be tricky to calculate the right date range for each of them since at times the mentioned date entity should be excluded or included from the date range, and the other range boundary need to be calculated based on time-granularity. In the pipeline approach, the NEL 203 identifies the time-granularity as well as inclusive/exclusive intents, then some heuristics are utilized to calculate the right date range based on these intents. If there are not good validation sets, the S2S model 502 cannot be trained to evaluate this issue.

The S2S model 502 model may predict some filters where the column type is not compatible with the filter type or filter value. For example, it predicted relative date filter with a non-date column, and it predicted a category filter where the cell value is not within the selected column. In the pipeline approach, the linked columns and cell values are ensured to be compatible with their corresponding entity types.

Figure 6:
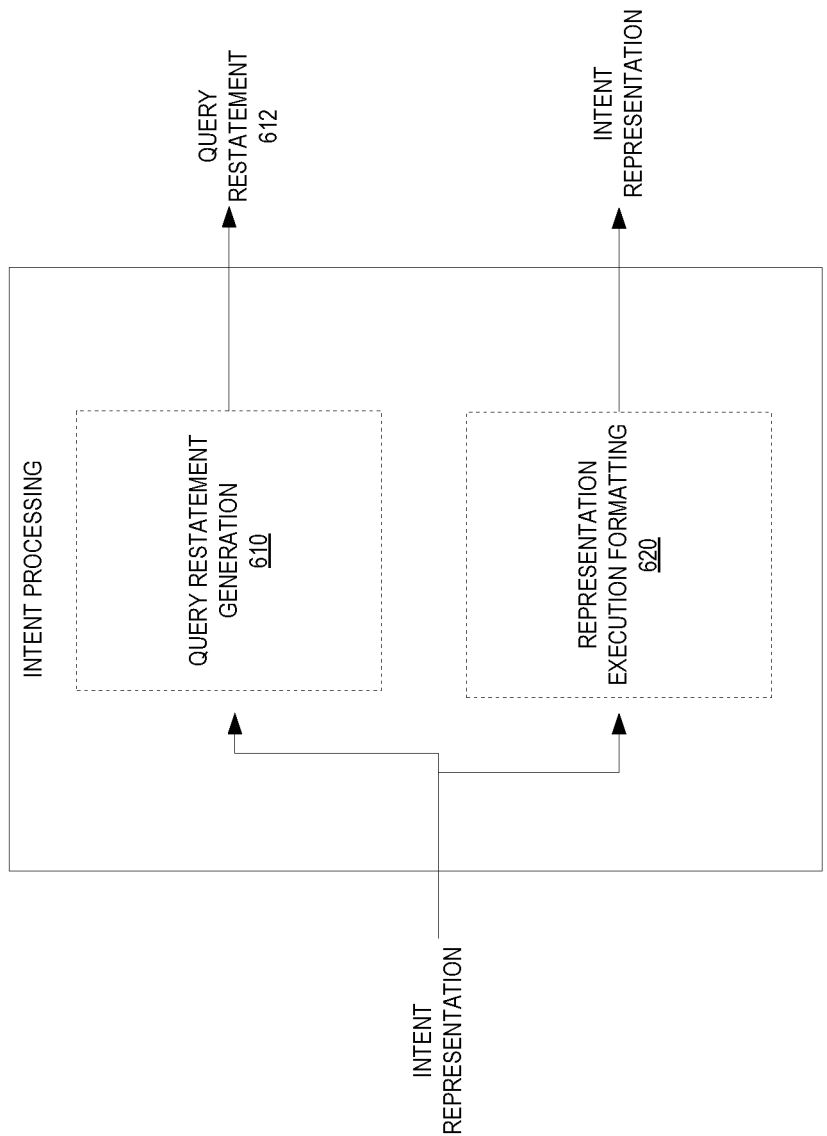
FIG. 6 is a logical block diagram illustrating intent representation processing for processing a natural language query, according to some examples.

FIG. 6 is a logical block diagram illustrating intent representation processing for processing a natural language query, according to some examples. In some examples, aspects of this diagram are implemented by the visualization component 209. An intent representation is provided for intent representation processing. In various embodiments, representation execution formatting 620 may be implemented. Representation execution formatting 620 transforms the representation into a specific format (e.g., an API or set of APIs to invoke visualization). In some embodiments, other execution systems for the query (e.g., the data storage system where the query is stored, for instance) may be used to execute the intent representation for execution.

In various embodiments, a query restatement generation 610 may be implemented. Query restatement generation 610 may generate from intent representation a query restatement 612. Query restatement 612 may offer natural language query performance benefits. For example, a developer can easily check the result to see if the intent representation is correct or not. The restatement 612 may provide better interaction with user. A user can correct a query based on the interpretable result and increase user confidence in the system and erase frictions.

Query restatement generate may implement a template based approach to generate restatements based on entities, linked columns and intent representation structures. Some example templates are listed below:

Showing $ {METRICS} for $ {FILTER.CELL_VALUE}
Showing $ {METRICS} for $ {FILTER.CELL_VALUE} for $ {DATASET} dataset.
Showing $ {METRICS} for $ {FILTER.CELL_VALUE} grouped by $ {GROUP_BY} for $ {DATASET} data
Showing $ {METRICS} for $ {FILTER.CELL_VALUE} grouped by $ {GROUP_BY} ordered by $ {ORDER Query restatement 612 may be displayed along with a result, in some embodiments. In some embodiments, query restatement 612 may provide interactive elements, allowing a user to select items in the restatement to display source information (e.g., column, operation, and dataset name). In at least some embodiments, query restatement 612 may be performed and/or implemented with intent generation.

Figure 7:
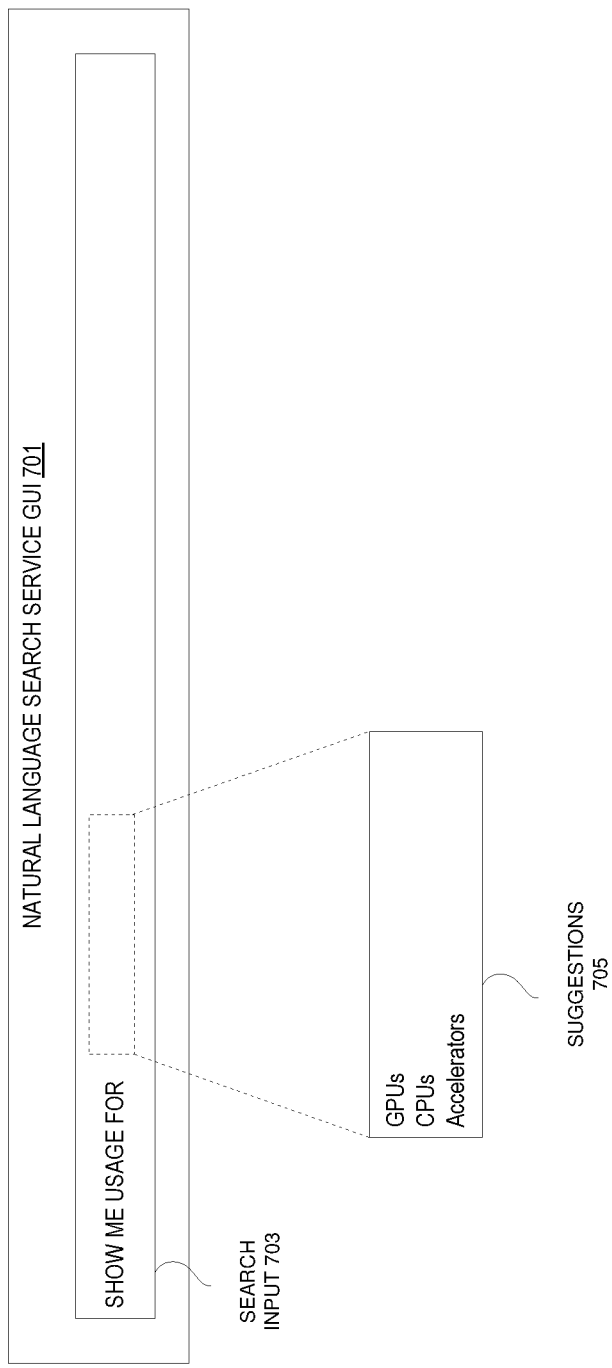
FIG. 7 illustrates examples of a graphical user interface for providing answers to queries.

FIG. 7 illustrates examples of a graphical user interface for providing answers to queries. The NLQ GUI 701 includes a search input element 703 (e.g., a text entry user interface element or other selectable user interface element for entering a NLQ such as a via a voice command or other audio input to enter the NLQ). The text of the NLQ is displayed in the search input element 703.

In some examples, as the text of the NLQ is entered, an auto-complete provides suggestions using obtained metadata as indicated by 705. For example, different options of suggested columns from available datasets may be displayed from which a user may be able to select the appropriate column. Other suggestions including various column aliases, or cell value aliases, may be made. This output and selection, in some examples, is the user input 221.

Figure 8:
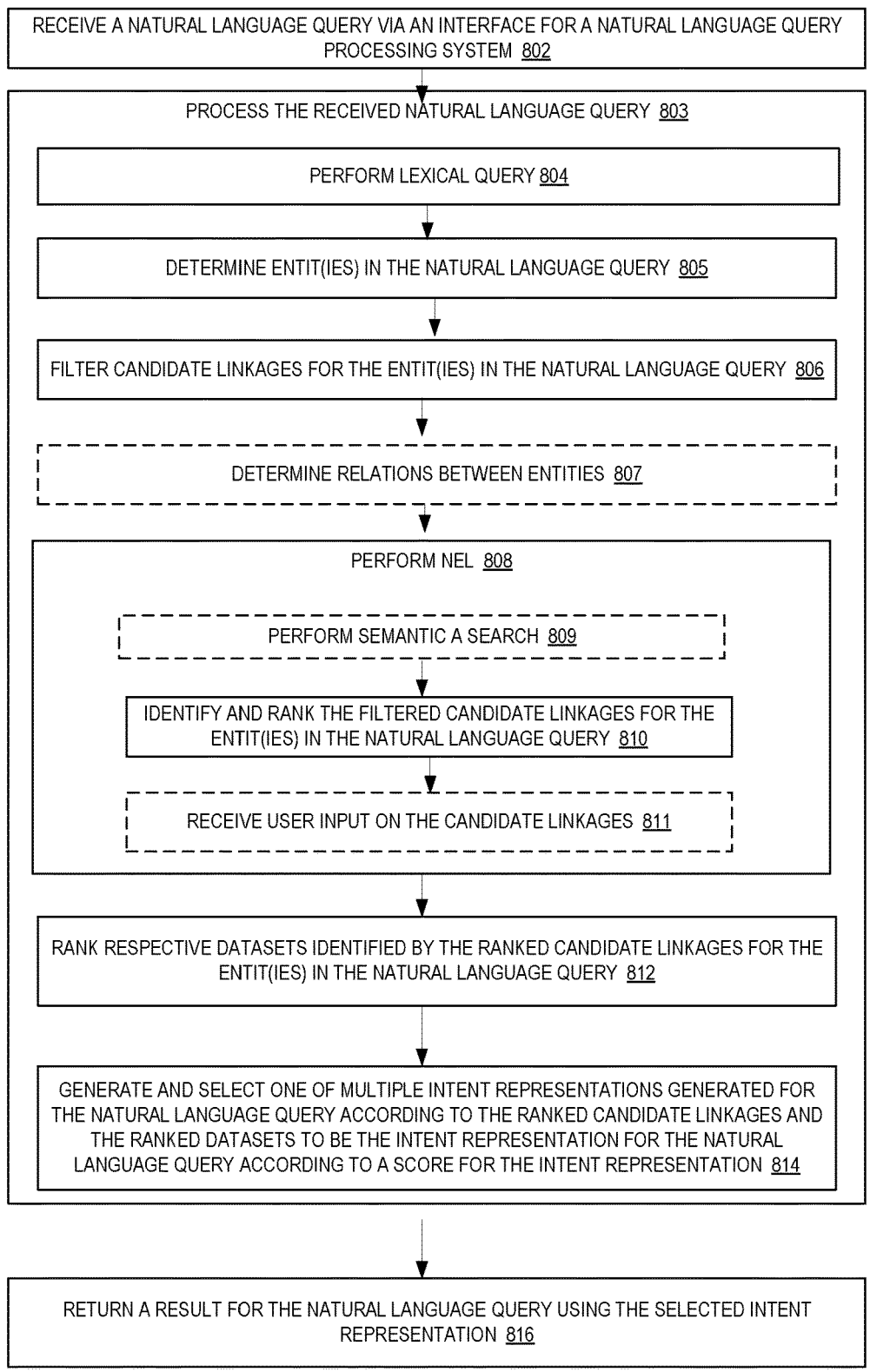
FIG. 8 is a flow diagram illustrating operations of a method for handling a NLQ according to some examples.

FIG. 8 is a flow diagram illustrating operations of a method for handling a NLQ according to some examples. Some or all of the operations (or other processes described herein, or variations, and/or combinations thereof) are performed under the control of one or more computer systems configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some examples, one or more (or all) of the operations are performed by the NLQ processing service 110 of the other figures.

As indicated at 802, a natural language query may be received via an interface for a natural language query processing system, in some embodiments. For example, the natural language query may be entered via a graphical user interface, command line interface, or other interface (e.g., an API). The natural language query may not explicitly identify tables, data stores, or other locations of specific datasets to query, in some embodiments.

As indicated at 803, the natural language query is processed through a natural language query processing pipeline.

A lexical query (search) is performed to retrieve metadata for the query at 804 (note this may be considered to be outside of the pipeline). In some examples, the search service 211 performs this query.

Entities in the natural query language are recognized at 805 using the NER 202. Examples of the NER 202 are detailed above.

Candidate linkages for the entit(ies) in the natural language query are filtered (e.g., using a lexical query of search service 211) at 806. For example, for entities of type "column name", candidates may be retrieved from a column name index. The column name index, which may be generated from metadata provided (as discussed) above for the various available datasets, may be used to identify column names using known column names, column aliases or column "friendly names" associated with a column. For entities of type "cell value", candidates may be retrieved from a cell value index generated from metadata provided (as discussed) above for the various available datasets, may be used to identify column names using known distinct cell values (e.g., from String type columns) and cell value aliases.

In some examples, relations between entities is determined at 807. For example, the relation extraction model 241 is used to determine relations. Examples of how that is accomplished are detailed above.

Named entity linking is performed using NEL 203 at 808. Named entity linking includes one or more acts. In some examples, NEL includes performing a semantic search at 809. Examples of how to perform such as a search are detailed above. Semantic searching provides more context for the act of identifying and ranking the filtered candidate linkages for the entit (ies) in the natural language query using entity linkage model 301 at 810. In some examples, user input is received at 811 to inform the identifying and ranking the filtered candidate linkages (such that the identifying and ranking the filtered candidate linkages may be performed again or a selection of a plurality of candidates is made).

The respective datasets identified by the ranked candidate linkages for the entit (ies) in the natural language query are ranked at 812 (e.g., using DSS 205).

An intent representation generation model 207 leverages a grammar-based decoder to generate an intent representation based on the question, dataset schema, and the NER/NEL/DSS predictions and selects one of a multiple of intent representations according to the ranked candidate linkages and the ranked datasets to be the intent representation for the natural language query according to a score for the intent representation at 814.

At 816, a result for the natural language query determined using the intent representation of the natural language query is returned via an interface, in some embodiments. In some embodiments, if a confidence value for none of the intent representations is above a minimum threshold, then an error or prompt to specify the natural language query according to an interface, protocol, or query language may be returned (e.g., a prompt to rewrite the natural language query as a SQL query). Confidence values generated at other stages in a natural language query processing pipeline (e.g., NER 202, NEL 203, or dataset selection 205) may also trigger an error or prompt to specify the natural language query according to an interface, protocol, or query language if minimum confidence values are not met, in some embodiments.

Figure 9:
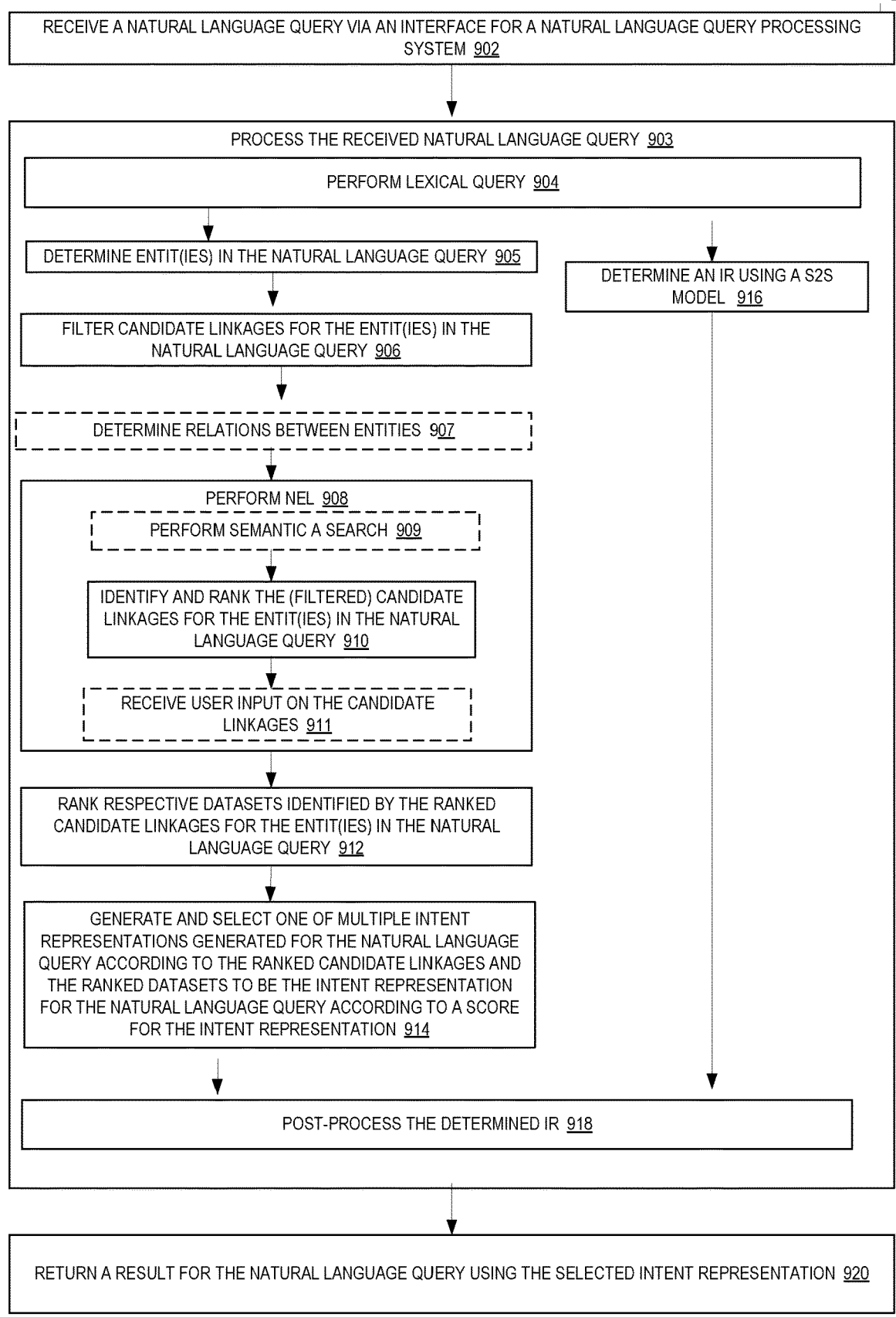
FIG. 9 is a flow diagram illustrating operations of a method for handling a NLQ according to some examples.

FIG. 9 is a flow diagram illustrating operations of a method for handling a NLQ according to some examples. Some or all of the operations (or other processes described herein, or variations, and/or combinations thereof) are performed under the control of one or more computer systems configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some examples, one or more (or all) of the operations are performed by the NLQ processing service 110 of the other figures.

As indicated at 902, a natural language query may be received via an interface for a natural language query processing system, in some embodiments. For example, the natural language query may be entered via a graphical user interface, command line interface, or other interface (e.g., an API). The natural language query may not explicitly identify tables, data stores, or other locations of specific datasets to query, in some embodiments.

As indicated at 903, the natural language query is processed.

At 904, a lexical query is performed to retrieve metadata for the query.

In some examples, only an S2S model (and not the pipeline) is used to respond to the query. In those examples, an intent representation is determined using the S2S model at 914. The S2S model takes in the NLQ and a schema.

In examples, that also use, or alternatively use, the language query processing pipeline, As indicated at 803, the natural language query is processed through a natural language query processing pipeline.

A lexical query (search) is performed to retrieve metadata for the query at 804 (note this may be considered to be outside of the pipeline). In some examples, the search service 211 performs this query.

Entities in the natural query language are recognized at 805 using the NER 202. Examples of the NER 202 are detailed above.

Candidate linkages for the entit (ies) in the natural language query are filtered (e.g., using a lexical query of search service 211) at 806. For example, for entities of type "column name", candidates may be retrieved from a column name index. The column name index, which may be generated from metadata provided (as discussed) above for the various available datasets, may be used to identify column names using known column names, column aliases or column "friendly names" associated with a column. For entities of type "cell value", candidates may be retrieved from a cell value index generated from metadata provided (as discussed) above for the various available datasets, may be used to identify column names using known distinct cell values (e.g., from String type columns) and cell value aliases.

In some examples, relations between entities is determined at 807. For example, the relation extraction model 241 is used to determine relations. Examples of how that is accomplished are detailed above.

Named entity linking is performed using NEL 203 at 808. Named entity linking includes one or more acts. In some examples, NEL includes performing a semantic search at 809. Examples of how to perform such as a search are detailed above. Semantic searching provides more context for the act of identifying and ranking the filtered candidate linkages for the entit (ics) in the natural language query using entity linkage model 301 at 810. In some examples, user input is received at 811 to inform the identifying and ranking the filtered candidate linkages (such that the identifying and ranking the filtered candidate linkages may be performed again or a selection of a plurality of candidates is made).

The respective datasets identified by the ranked candidate linkages for the entit (ies) in the natural language query are ranked at 812 (e.g., using DSS 205).

An intent representation generation model 207 leverages a grammar-based decoder to generate an intent representation based on the question, dataset schema, and the NER/NEL/DSS predictions and selects one of a multiple of intent representations according to the ranked candidate linkages and the ranked datasets to be the intent representation for the natural language query according to a score for the intent representation at 814.

At 816, a result for the natural language query (e.g., an answer to the question which may include a visualization) determined using the intent representation of the natural language query is returned via an interface, in some embodiments. In some embodiments, if a confidence value for none of the intent representations is above a minimum threshold, then an error or prompt to specify the natural language query according to an interface, protocol, or query language may be returned (e.g., a prompt to rewrite the natural language query as a SQL query). Confidence values generated at other stages in a natural language query processing pipeline (e.g., NER 202, NEL 203, or dataset selection 205) may also trigger an error or prompt to specify the natural language query according to an interface, protocol, or query language if minimum confidence values are not met, in some embodiments.

The determined intent representation is post-processed at 918 when S2S is used. Note that in some hybrid examples acts beyond NEL 203 of the pipeline are not performed. In some examples, post-processing includes selecting which approach to use. Other examples of post-processing have been described above.

As indicated at 920, a result for the natural language query (e.g., an answer to the question which may include a visualization) determined using the intent representation of the natural language query may be returned via an interface, in some embodiments. In some embodiments, if a confidence value for none of the intent representations is above a minimum threshold, then an error or prompt to specify the natural language query according to an interface, protocol, or query language may be returned (e.g., a prompt to rewrite the natural language query as a SQL query). Confidence values generated at other stages in a natural language query processing pipeline (e.g., NER 202, NEL 203, or dataset selection 205) may also trigger an error or prompt to specify the natural language query according to an interface, protocol, or query language if minimum confidence values are not met, in some embodiments.

Figure 13:
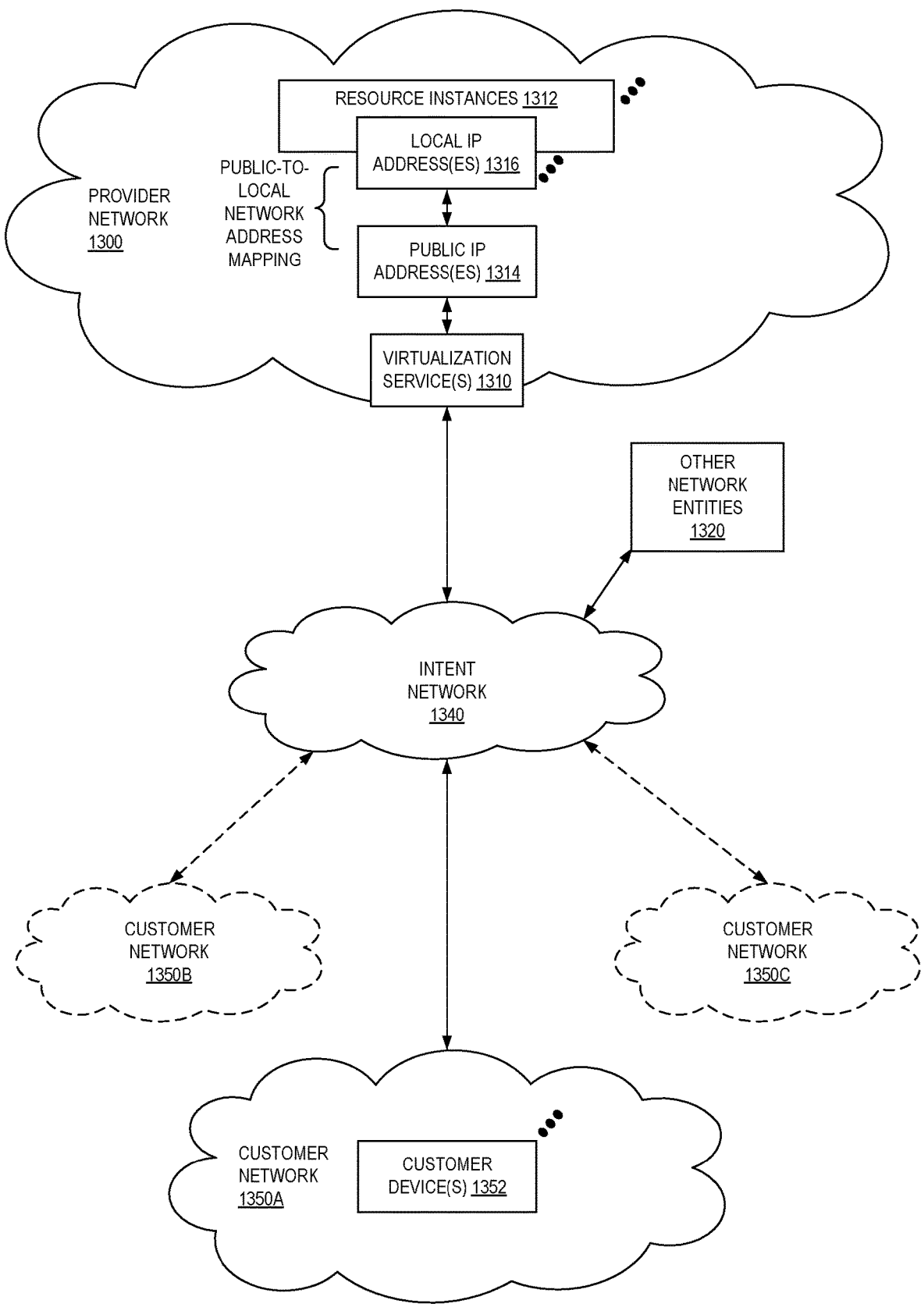
FIG. 13 illustrates an example provider network environment according to some examples.

FIG. 13 illustrates an example provider network (or "service provider system") environment according to some examples. A provider network 1300 can provide resource virtualization to customers via one or more virtualization services 1310 that allow customers to purchase, rent, or otherwise obtain instances 1312 of virtualized resources, including but not limited to computation and storage resources, implemented on devices within the provider network or networks in one or more data centers. Local Internet Protocol (IP) addresses 1316 can be associated with the resource instances 1312; the local IP addresses are the internal network addresses of the resource instances 1312 on the provider network 1300. In some examples, the provider network 1300 can also provide public IP addresses 1314 and/or public IP address ranges (e.g., Internet Protocol version 4 (IPv4) or Internet Protocol version 6 (IPv6) addresses) that customers can obtain from the provider 1300.

Conventionally, the provider network 1300, via the virtualization services 1310, can allow a customer of the service provider (e.g., a customer that operates one or more customer networks 1350A-1350C (or "client networks") including one or more customer device(s) 1352) to dynamically associate at least some public IP addresses 1314 assigned or allocated to the customer with particular resource instances 1312 assigned to the customer. The provider network 1300 can also allow the customer to remap a public IP address 1314, previously mapped to one virtualized computing resource instance 1312 allocated to the customer, to another virtualized computing resource instance 1312 that is also allocated to the customer. Using the virtualized computing resource instances 1312 and public IP addresses 1314 provided by the service provider, a customer of the service provider such as the operator of the customer network(s) 1350A-1350C can, for example, implement customer-specific applications and present the customer's applications on an intermediate network 1340, such as the Internet. Other network entities 1320 on the intermediate network 1340 can then generate traffic to a destination public IP address 1314 published by the customer network(s) 1350A-1350C; the traffic is routed to the service provider data center, and at the data center is routed, via a network substrate, to the local IP address 1316 of the virtualized computing resource instance 1312 currently mapped to the destination public IP address 1314. Similarly, response traffic from the virtualized computing resource instance 1312 can be routed via the network substrate back onto the intermediate network 1340 to the source entity 1320.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and can be mutable within the provider network. Network traffic originating outside the provider network is not directly routed to local IP addresses; instead, the traffic uses public IP addresses that are mapped to the local IP addresses of the resource instances. The provider network can include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses can be assigned by the provider network infrastructure to particular resource instances; these public IP addresses can be referred to as standard public IP addresses, or simply standard IP addresses. In some examples, the mapping of a standard IP address to a local IP address of a resource instance is the default launch configuration for all resource instance types.

At least some public IP addresses can be allocated to or obtained by customers of the provider network 1300; a customer can then assign their allocated public IP addresses to particular resource instances allocated to the customer. These public IP addresses can be referred to as customer public IP addresses, or simply customer IP addresses. Instead of being assigned by the provider network 1300 to resource instances as in the case of standard IP addresses, customer IP addresses can be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 14:
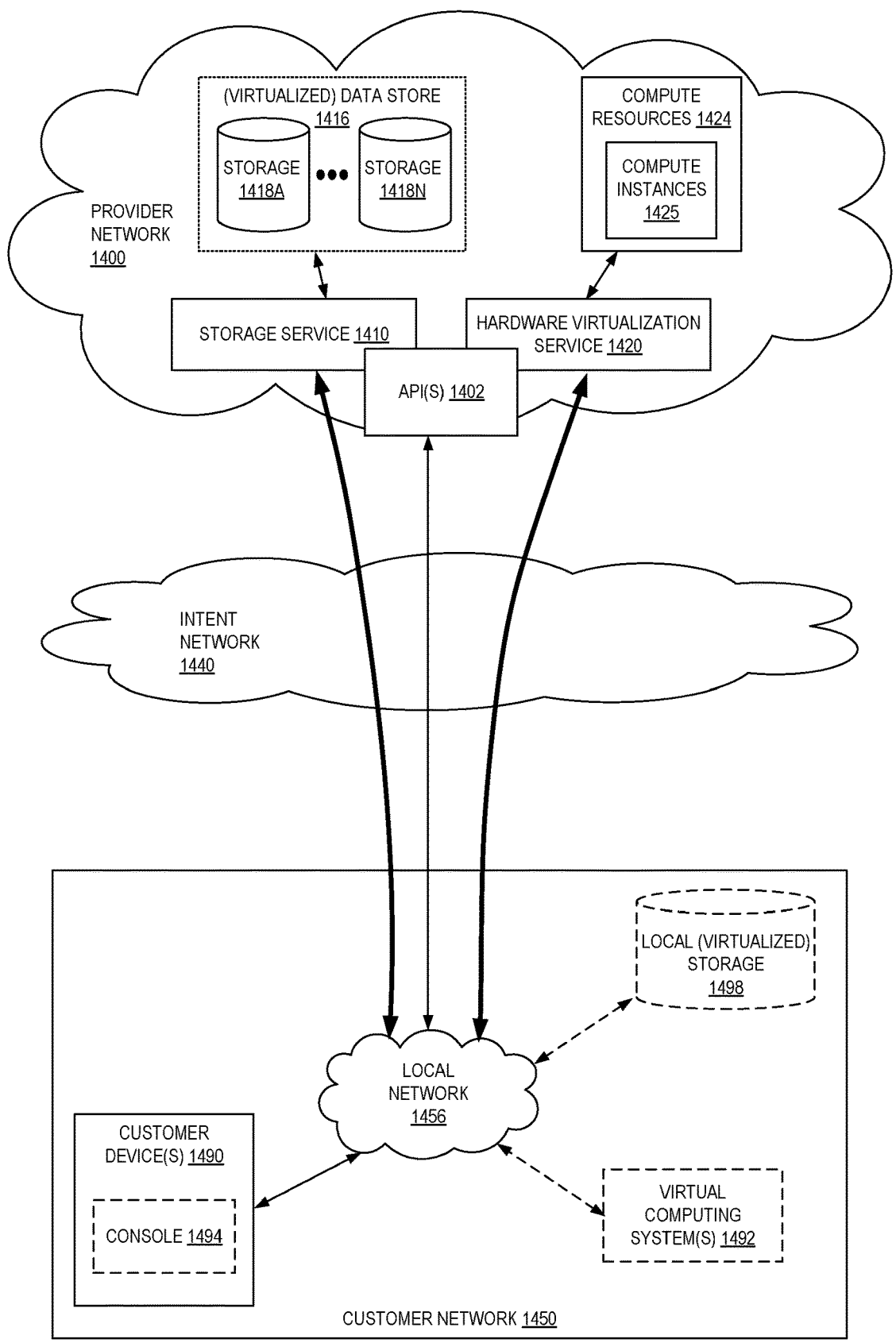
FIG. 14 is a block diagram of an example provider network that provides a storage service and a hardware virtualization service to customers according to some examples.

FIG. 14 is a block diagram of an example provider network environment that provides a storage service and a hardware virtualization service to customers, according to some examples. A hardware virtualization service 1420 provides multiple compute resources 1424 (e.g., compute instances 1425, such as VMs) to customers. The compute resources 1424 can, for example, be provided as a service to customers of a provider network 1400 (e.g., to a customer that implements a customer network 1450). Each computation resource 1424 can be provided with one or more local IP addresses. The provider network 1400 can be configured to route packets from the local IP addresses of the compute resources 1424 to public Internet destinations, and from public Internet sources to the local IP addresses of the compute resources 1424.

The provider network 1400 can provide the customer network 1450, for example coupled to an intermediate network 1440 via a local network 1456, the ability to implement virtual computing systems 1492 via the hardware virtualization service 1420 coupled to the intermediate network 1440 and to the provider network 1400. In some examples, the hardware virtualization service 1420 can provide one or more APIs 1402, for example a web services interface, via which the customer network 1450 can access functionality provided by the hardware virtualization service 1420, for example via a console 1494 (e.g., a web-based application, standalone application, mobile application, etc.) of a customer device 1490. In some examples, at the provider network 1400, each virtual computing system 1492 at the customer network 1450 can correspond to a computation resource 1424 that is leased, rented, or otherwise provided to the customer network 1450.

From an instance of the virtual computing system(s) 1492 and/or another customer device 1490 (e.g., via console 1494), the customer can access the functionality of a storage service 1410, for example via the one or more APIs 1402, to access data from and store data to storage resources 1418A-1418N of a virtual data store 1416 (e.g., a folder or "bucket," a virtualized volume, a database, etc.) provided by the provider network 1400. In some examples, a virtualized data store gateway (not shown) can be provided at the customer network 1450 that can locally cache at least some data, for example frequently accessed or critical data, and that can communicate with the storage service 1410 via one or more communications channels to upload new or modified data from a local cache so that the primary store of data (the virtualized data store 1416) is maintained. In some examples, a user, via the virtual computing system 1492 and/or another customer device 1490, can mount and access virtual data store 1416 volumes via the storage service 1410 acting as a storage virtualization service, and these volumes can appear to the user as local (virtualized) storage 1498.

While not shown in FIG. 14, the virtualization service(s) can also be accessed from resource instances within the provider network 1400 via the API(s) 1402. For example, a customer, appliance service provider, or other entity can access a virtualization service from within a respective virtual network on the provider network 1400 via the API(s) 1402 to request allocation of one or more resource instances within the virtual network or within another virtual network.

Illustrative Systems

Figure 15:
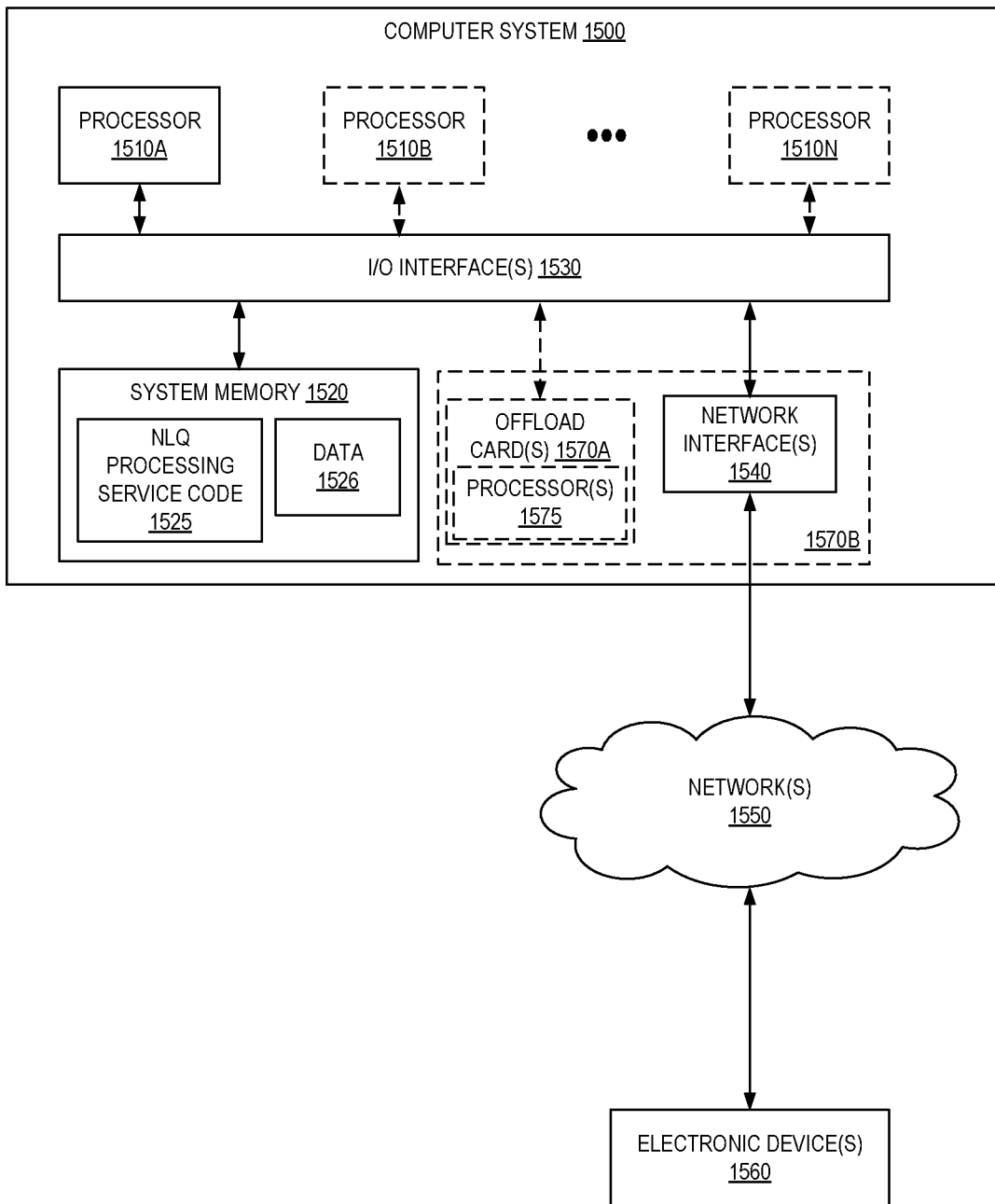
FIG. 15 is a block diagram illustrating an example computer system that can be used in some examples.

In some examples, a system that implements a portion or all of the techniques described herein can include a general-purpose computer system, such as the computer system 1500 (also referred to as a computing device or electronic device) illustrated in FIG. 15, that includes, or is configured to access, one or more computer-accessible media. In the illustrated example, the computer system 1500 includes one or more processors 1510 coupled to a system memory 1520 via an input/output (I/O) interface 1530. The computer system 1500 further includes a network interface 1540 coupled to the I/O interface 1530. While FIG. 15 shows the computer system 1500 as a single computing device, in various examples the computer system 1500 can include one computing device or any number of computing devices configured to work together as a single computer system 1500.

In various examples, the computer system 1500 can be a uniprocessor system including one processor 1510, or a multiprocessor system including several processors 1510 (e.g., two, four, eight, or another suitable number). The processor(s) 1510 can be any suitable processor(s) capable of executing instructions. For example, in various examples, the processor(s) 1510 can be general-purpose or embedded processors implementing any of a variety of instruction set architectures (ISAs), such as the x86, ARM, PowerPC, SPARC, or MIPS ISAs, or any other suitable ISA. In multiprocessor systems, each of the processors 1510 can commonly, but not necessarily, implement the same ISA.

The system memory 1520 can store instructions and data accessible by the processor(s) 1510. In various examples, the system memory 1520 can be implemented using any suitable memory technology, such as random-access memory (RAM), static RAM (SRAM), synchronous dynamic RAM (SDRAM), nonvolatile/Flash-type memory, or any other type of memory. In the illustrated example, program instructions and data implementing one or more desired functions, such as those methods, techniques, and data described above, are shown stored within the system memory 1520 as NLQ processing service code 1525 (e.g., executable to implement, in whole or in part, the NLQ processing service 110) and data 1526.

In some examples, the I/O interface 1530 can be configured to coordinate I/O traffic between the processor 1510, the system memory 1520, and any peripheral devices in the device, including the network interface 1540 and/or other peripheral interfaces (not shown). In some examples, the I/O interface 1530 can perform any necessary protocol, timing, or other data transformations to convert data signals from one component (e.g., the system memory 1520) into a format suitable for use by another component (e.g., the processor 1510). In some examples, the I/O interface 1530 can include support for devices attached through various types of peripheral buses, such as a variant of the Peripheral Component Interconnect (PCI) bus standard or the Universal Serial Bus (USB) standard, for example. In some examples, the function of the I/O interface 1530 can be split into two or more separate components, such as a north bridge and a south bridge, for example. Also, in some examples, some or all of the functionality of the I/O interface 1530, such as an interface to the system memory 1520, can be incorporated directly into the processor 1510.

The network interface 1540 can be configured to allow data to be exchanged between the computer system 1500 and other devices 1560 attached to a network or networks 1550, such as other computer systems or devices as illustrated in FIG. 1, for example. In various examples, the network interface 1540 can support communication via any suitable wired or wireless general data networks, such as types of Ethernet network, for example. Additionally, the network interface 1540 can support communication via telecommunications/telephony networks, such as analog voice networks or digital fiber communications networks, via storage area networks (SANs), such as Fibre Channel SANs, and/or via any other suitable type of network and/or protocol.

In some examples, the computer system 1500 includes one or more offload cards 1570A or 1570B (including one or more processors 1575, and possibly including the one or more network interfaces 1540) that are connected using the I/O interface 1530 (e.g., a bus implementing a version of the Peripheral Component Interconnect-Express (PCI-E) standard, or another interconnect such as a QuickPath interconnect (QPI) or UltraPath interconnect (UPI)). For example, in some examples the computer system 1500 can act as a host electronic device (e.g., operating as part of a hardware virtualization service) that hosts compute resources such as compute instances, and the one or more offload cards 1570A or 1570B execute a virtualization manager that can manage compute instances that execute on the host electronic device. As an example, in some examples the offload card(s) 1570A or 1570B can perform compute instance management operations, such as pausing and/or un-pausing compute instances, launching and/or terminating compute instances, performing memory transfer/copying operations, etc. These management operations can, in some examples, be performed by the offload card(s) 1570A or 1570B in coordination with a hypervisor (e.g., upon a request from a hypervisor) that is executed by the other processors 1510A-1510N of the computer system 1500. However, in some examples the virtualization manager implemented by the offload card(s) 1570A or 1570B can accommodate requests from other entities (e.g., from compute instances themselves), and cannot coordinate with (or service) any separate hypervisor.

In some examples, the system memory 1520 can be one example of a computer-accessible medium configured to store program instructions and data as described above. However, in other examples, program instructions and/or data can be received, sent, or stored upon different types of computer-accessible media. Generally speaking, a computer-accessible medium can include any non-transitory storage media or memory media such as magnetic or optical media, e.g., disk or DVD/CD coupled to the computer system 1500 via the I/O interface 1530. A non-transitory computer-accessible storage medium can also include any volatile or non-volatile media such as RAM (e.g., SDRAM, double data rate (DDR) SDRAM, SRAM, etc.), read only memory (ROM), etc., that can be included in some examples of the computer system 1500 as the system memory 1520 or another type of memory. Further, a computer-accessible medium can include transmission media or signals such as electrical, electromagnetic, or digital signals, conveyed via a communication medium such as a network and/or a wireless link, such as can be implemented via the network interface 1540.

Various examples discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most examples use at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In examples using a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also can be capable of executing programs or scripts in response requests from user devices, such as by executing one or more Web applications that can be implemented as one or more scripts or programs written in any programming language, such as Java®, C, C#or C++, or any scripting language, such as Perl, Python, PHP, or TCL, as well as combinations thereof. The server(s) can also include database servers, including without limitation those commercially available from Oracle®. Microsoft®, Sybase®, IBM®, etc. The database servers can be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of examples, the information can reside in a storage-area network (SAN) familiar to those skilled in the art. Similarly, any necessary files for performing the functions attributed to the computers, servers, or other network devices can be stored locally and/or remotely, as appropriate. Where a system includes computerized devices, each such device can include hardware elements that can be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system can also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate examples can have numerous variations from that described above. For example, customized hardware might also be used and/or particular elements might be implemented in hardware, software (including portable software, such as applets), or both. Further, connection to other computing devices such as network input/output devices can be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various examples.

In the preceding description, various examples are described. For purposes of explanation, specific configurations and details are set forth to provide a thorough understanding of the examples. However, it will also be apparent to one skilled in the art that the examples can be practiced without the specific details. Furthermore, well-known features can be omitted or simplified in order not to obscure the example being described.

Bracketed text and blocks with dashed borders (e.g., large dashes, small dashes, dot-dash, and dots) are used herein to illustrate optional aspects that add additional features to some examples. However, such notation should not be taken to mean that these are the only options or optional operations, and/or that blocks with solid borders are not optional in certain examples.

Reference numerals with suffix letters (e.g., 1418A-1418N) can be used to indicate that there can be one or multiple instances of the referenced entity in various examples, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters might or might not have the same number of instances in various examples.

References to "one example," "an example," etc., indicate that the example described may include a particular feature, structure, or characteristic, but every example may not necessarily include the particular feature, structure, or characteristic. Moreover, such phrases are not necessarily referring to the same example. Further, when a particular feature, structure, or characteristic is described in connection with an example, it is submitted that it is within the knowledge of one skilled in the art to affect such feature, structure, or characteristic in connection with other examples whether or not explicitly described.

Moreover, in the various examples described above, unless specifically noted otherwise, disjunctive language such as the phrase "at least one of A, B, or C" is intended to be understood to mean either A, B, or C, or any combination thereof (e.g., A, B, and/or C). Similarly, language such as "at least one or more of A, B, and C" (or "one or more of A, B, and C") is intended to be understood to mean A, B, or C, or any combination thereof (e.g., A, B, and/or C). As such, disjunctive language is not intended to, nor should it be understood to, imply that a given example requires at least one of A, at least one of B, and at least one of C to each be present.

As used herein, the term "based on" (or similar) is an open-ended term used to describe one or more factors that affect a determination or other action. It is to be understood that this term does not foreclose additional factors that may affect a determination or action. For example, a determination may be solely based on the factor(s) listed or based on the factor(s) and one or more additional factors. Thus, if an action A is "based on" B, it is to be understood that B is one factor that affects action A, but this does not foreclose the action from also being based on one or multiple other factors, such as factor C. However, in some instances, action A may be based entirely on B.

Unless otherwise explicitly stated, articles such as "a" or "an" should generally be interpreted to include one or multiple described items. Accordingly, phrases such as "a device configured to" or "a computing device" are intended to include one or multiple recited devices. Such one or more recited devices can be collectively configured to carry out the stated operations. For example, "a processor configured to carry out operations A, B, and C" can include a first processor configured to carry out operation A working in conjunction with a second processor configured to carry out operations B and C.

Further, the words "may" or "can" are used in a permissive sense (i.e., meaning having the potential to), rather than the mandatory sense (i.e., meaning must). The words "include," "including," and "includes" are used to indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for the nouns that they precede, and do not imply any type of ordering (e.g., spatial, temporal, logical, etc.) unless such an ordering is otherwise explicitly indicated. Similarly, the values of such numeric labels are generally not used to indicate a required amount of a particular noun in the claims recited herein, and thus a "fifth" element generally does not imply the existence of four other elements unless those elements are explicitly included in the claim or it is otherwise made abundantly clear that they exist.

The specification and drawings are, accordingly, to be regarded in an illustrative rather than a restrictive sense. It will, however, be evident that various modifications and changes can be made thereunto without departing from the broader scope of the disclosure as set forth in the claims.

What is claimed is:

1. A computer-implemented method comprising:
   receiving a natural language query (NLQ);
   performing a lexical query to retrieve a set of candidate datasets for the NLQ;
   performing named entity recognition (NER) on the NLQ to identify a set of named entities;
   performing named entity linking (NEL) to link the set of named entities to corresponding columns or cells in the set of candidate datasets;
   based on performing the NEL, selecting a set of top-K candidate datasets from the set of candidate datasets;
   generating an intent representation (IR) using a sequence-to-sequence (S2S) machine learning model, the NLQ, and the set of top-K candidate datasets; and
   generating a visualization for the intent representation (IR).

2. The computer-implemented method of claim 1 further comprising performing a lexical query to retrieve metadata for the NLQ, wherein the metadata comprises one or more of sorted column names, sorted named entities, sorted named expressions, and sorted named filters.

3. The computer-implemented method of claim 1, wherein the generated IR comprises the IR and additional data comprising one or more of a metric, a group by listing, a filter, and an indication of a type of visualization to use.

4. A computer-implemented method comprising:
   receiving a natural language query (NLQ);
   performing a lexical query to retrieve metadata for the NLQ, wherein the metadata is associated with one or more datasets;
   generating an intent representation (IR) using a sequence-to-sequence (S2S) machine learning model, wherein input to the S2S machine-learning model includes at least a portion of the retrieved metadata as a schema and the NLQ, and wherein output from the S2S machine-learning model includes the IR;
   performing named entity recognition (NER) on the NLQ to identify a set of named entities in the NLQ;
   performing named entity linking (NEL) to output fine-grained information, wherein the fine-grained information comprises information for linking one or more entities of the set of named entities to corresponding columns or cells of one or more of the datasets;
   post-processing the IR using the fine-grained information by revising at least a subset of data within the IR, re-organizing a structure of the IR, or selecting a final dataset to use from the one or more datasets from an entity linker; and
   generating a visualization for the post-processed IR.

5. The computer-implemented method of claim 4, wherein the S2S machine-learning model is a Transformer-based model.

6. The computer-implemented method of claim 4, further comprising:
   receiving user input from a graphical user interface; and
   generating a second IR using the S2S machine learning model based at least in part on the received user input.

7. The computer-implemented method of claim 4, wherein the schema comprises one or more of sorted column names, sorted named entities, sorted named expressions, and sorted named filters.

8. The computer-implemented method of claim 4, wherein the generated IR comprises the IR and additional data comprising one or more of a metric, a group by listing, a filter, and an indication of a type of visualization to use.

9. The computer-implemented method of claim 8, wherein the filter has a particular format.

10. The computer-implemented method of claim 4, wherein the lexical query is performed by a service of a provider network.

11. The computer-implemented method of claim 4, further comprising:
    processing the natural language query through a query language processing pipeline by:
      recognizing one or more entities in the natural language query;
      filtering respective candidate linkages for the one or more entities in the natural language query; and
      ranking the filtered candidate linkages for the one or more entities in the natural language query.

12. The computer-implemented method of claim 11, further comprising:
    selecting between the intent representation (IR) and the query language processing pipeline.

13. The computer-implemented method of claim 4, wherein the metadata comprises at least columns that match the one or more entities recognized in the natural language query.

14. The computer-implemented method of claim 13, wherein the metadata further comprises cell information.

15. A system comprising:
    a first one or more electronic devices to implement a database storage service in a multi-tenant provider network; and
    a second one or more electronic devices to implement a natural language query processing service in the multi-tenant provider network, the natural language query processing service including instructions that upon execution cause the natural language query processing service to:
    receive a natural language query (NLQ);
    perform a lexical query to retrieve metadata for the NLQ from the database storage service, wherein the metadata is associated with one or more datasets;
    generate an intent representation (IR) using a sequence-to-sequence (S2S) machine learning model, wherein input to the S2S machine-learning model includes at least a portion of the retrieved metadata as a schema and the NLQ, and wherein output from the S2S machine-learning model includes the IR;
    perform named entity recognition (NER) on the NLQ to identify a set of named entities in the NLQ;
    perform named entity linking (NEL) to output fine-grained information, wherein the fine-grained information comprises information for linking one or more entities of the set of named entities to corresponding columns or cells of the one or more datasets;
    post-process the IR using the fine-grained information by revising at least a subset of data within the IR, re-organizing a structure of the IR, or selecting a final dataset to use from the one or more datasets; and
    generate a visualization for the post-processed IR.

16. The system of claim 15, wherein the S2S machine-learning model is a Transformer-based model.

17. The system of claim 15, wherein the schema comprises one or more of sorted column names, sorted named entities, sorted named expressions, and sorted named filters.

18. The system of claim 15, wherein the metadata comprises cell information and at least columns that match the one or more entities recognized in the natural language query.

* * * * *